United States Patent
Chang

(10) Patent No.: US 12,063,591 B2
(45) Date of Patent: Aug. 13, 2024

(54) METHOD AND APPARATUS FOR RELAY UTILIZING SIDELINK IN WIRELESS COMMUNICATION SYSTEM

(71) Applicant: ELECTRONICS AND TELECOMMUNICATIONS RESEARCH INSTITUTE, Daejeon (KR)

(72) Inventor: Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/394,194

(22) Filed: Aug. 4, 2021

(65) Prior Publication Data

US 2022/0046527 A1 Feb. 10, 2022

(30) Foreign Application Priority Data

Aug. 4, 2020 (KR) .................. 10-2020-0097283
Aug. 3, 2021 (KR) .................. 10-2021-0102190

(51) Int. Cl.
*H04W 88/04* (2009.01)
*H04W 48/00* (2009.01)
*H04W 80/02* (2009.01)
*H04W 92/18* (2009.01)

(52) U.S. Cl.
CPC .......... *H04W 48/17* (2013.01); *H04W 80/02* (2013.01); *H04W 88/04* (2013.01); *H04W 92/18* (2013.01)

(58) Field of Classification Search
CPC ..... H04W 48/17; H04W 80/02; H04W 88/04; H04W 92/18; H04B 7/15521; H04B 7/155
See application file for complete search history.

(56) References Cited

U.S. PATENT DOCUMENTS

| | | | |
|---|---|---|---|
| 9,974,066 B2 | 5/2018 | Novlan et al. | |
| 2017/0048906 A1 | 2/2017 | Lee et al. | |
| 2018/0070264 A1* | 3/2018 | Saiwai | H04W 72/04 |
| 2020/0163155 A1* | 5/2020 | Lee | H04W 72/23 |
| 2021/0013959 A1 | 1/2021 | Yuan et al. | |
| 2021/0282098 A1* | 9/2021 | Luo | H04W 72/0473 |

FOREIGN PATENT DOCUMENTS

| | | | | |
|---|---|---|---|---|
| CN | 113873580 A | * | 12/2021 | ........ H04W 36/0033 |
| EP | 2309808 B1 | | 7/2013 | |
| KR | 10-1268658 B1 | | 5/2013 | |
| KR | 10-2020-0114404 A | | 10/2020 | |
| WO | 2019/154060 A1 | | 8/2019 | |
| WO | 2019156505 A1 | | 8/2019 | |

* cited by examiner

*Primary Examiner* — Lakeram Jangbahadur
(74) *Attorney, Agent, or Firm* — Rabin & Berdo, P.C.

(57) ABSTRACT

A relaying method, performed by a relay terminal using sidelink in a communication system, may comprise: receiving a plurality of data units from a plurality of remote terminals; generating a multiplexed data unit including identification information of the plurality of remote terminals and the plurality of data units; and transmitting the multiplexed data unit to a base station, wherein the identification information includes a terminal identifier used to identify each of the plurality of remote terminals.

8 Claims, 16 Drawing Sheets

1000

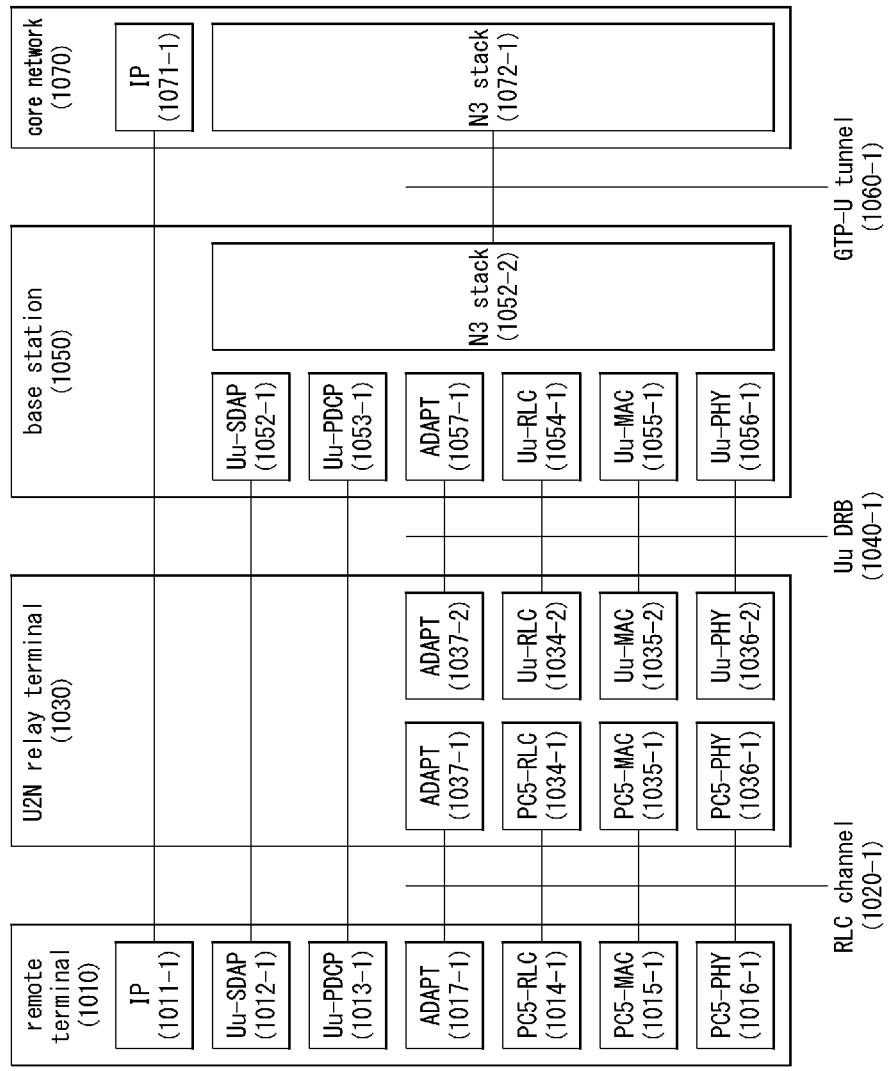

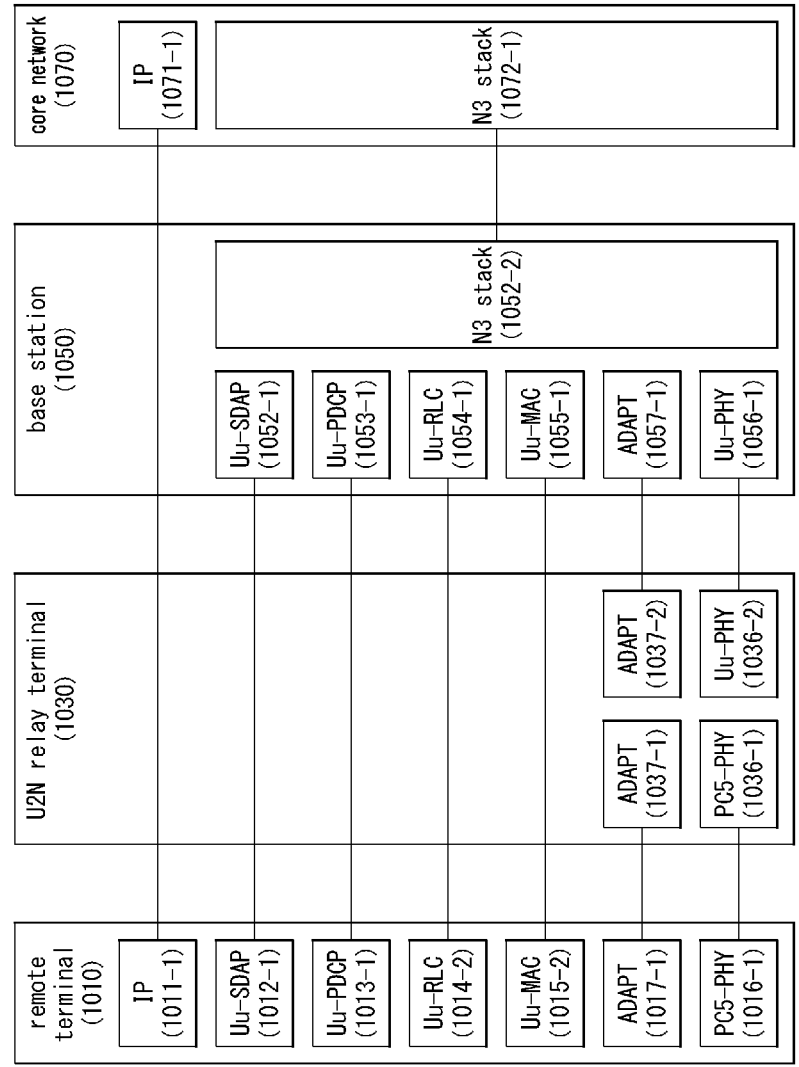

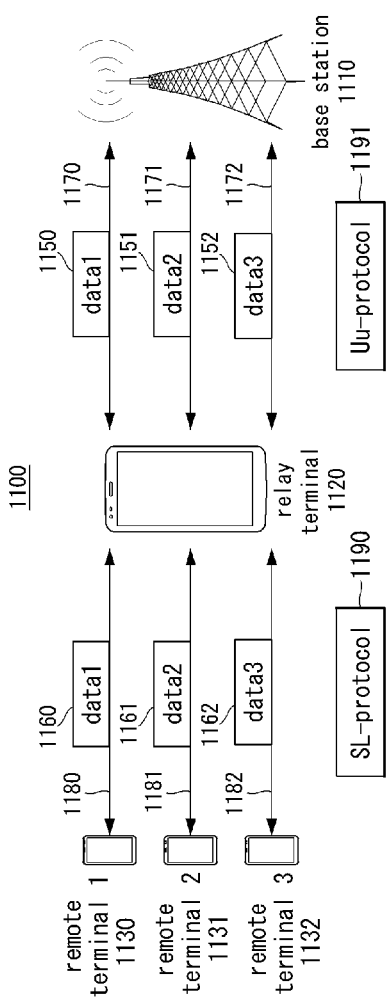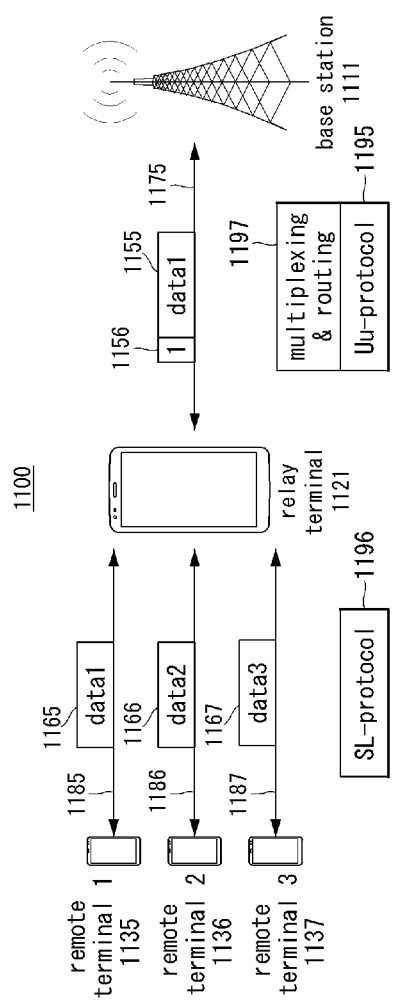

METHOD AND APPARATUS FOR RELAY UTILIZING SIDELINK IN WIRELESS COMMUNICATION SYSTEM

CROSS-REFERENCE TO RELATED APPLICATIONS

This application claims priority to Korean Patent Applications No. 10-2020-0097283 filed on Aug. 4, 2020 and No. 10-2021-0102190 filed on Aug. 3, 2021 with the Korean Intellectual Property Office (KIPO), the entire contents of which are hereby incorporated by reference.

BACKGROUND

1. Technical Field

The present disclosure relates to a relaying technique using sidelink in a wireless communication system, and more particularly, to a technique for effectively relaying communication between a base station and a remote terminal by using sidelink.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

A terminal may transmit or receive a radio signal to or from a cell provided by a base station in a radio section. The terminal may transmit or receive data to or from the cell of the base station by using a radio access protocol in which radio access functions are hierarchically configured. A service packet generated in a service layer may be transmitted to a counterpart terminal through the radio access protocol. The base station may split the radio access protocol into functional units, and may be configured as a set of the split functional units. The radio access functions provided by the radio access protocol may generally use a single frequency band, and may configure a bandwidth part (BWP) within the band. As a method of using multiple frequencies, carrier aggregation (CA), dual connectivity (DC), and/or the like may be used according to a configuration scheme of the radio access protocol.

The base station may be configured in various manners according to the size of coverage providing connections. When radio coverages of base stations providing various coverages are arranged to overlap each other, radio accesses may be provided to terminals within the coverages without interruption. In general, the size of coverage provided by a base station may depend on a frequency. For example, the size of radio coverage provided by the base station may decrease as the frequency increases. The size of radio coverage in which the base station provides services may be limited. In addition, the radio coverage in which the base station provides services may include a shadow area due to obstacles or the like. The services of the base station may not be provided outside the radio coverage provided by the base station or in the shadow area.

Meanwhile, in a radio communication environment, terminals adjacent to each other may perform communication through a sidelink by using a mutual discovery procedure, a procedure of configuring the sidelink with each other, and a procedure of transmitting resource information and data using sidelink resources in the sidelink. The terminals adjacent to each other may perform direct communication through the sidelink, and sidelink control and configuration procedures may be performed through functions included in the communication network, such as a sidelink server.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a relaying method for reliably providing services even to a terminal that does not communicate directly with a base station through relaying operations using sidelink communication between terminals, and an apparatus for the same.

According to an exemplary embodiment of the present disclosure for achieving the above-described objective, a relaying method, performed by a relay terminal using sidelink in a communication system, may comprise: receiving a plurality of data units from a plurality of remote terminals; generating a multiplexed data unit including identification information of the plurality of remote terminals and the plurality of data units; and transmitting the multiplexed data unit to a base station, wherein the identification information includes a terminal identifier used to identify each of the plurality of remote terminals.

The generating of the multiplexed data unit may comprise: delivering, by a plurality of first entities supporting functions of a radio link control (RLC) layer included in the relay terminal, the plurality of data units to a second entity performing functions of an adaptation layer included in the relay terminal; and generating, by the second entity, the multiplexed data unit including the identification information of the plurality of remote terminals and the plurality of data units.

The identification information may be delivered from the base station to the relay terminal whenever each of the plurality of remote terminals is connected to the relay terminal.

A radio bearer for each of the plurality of remote terminals may be independently configured, a first data unit of a first remote terminal among the plurality of remote terminals may correspond to a first radio bearer, and a second data unit of a second remote terminal among the plurality of remote terminals may correspond to a second radio bearer.

The identification information may further include a bearer identifier for identifying each of a plurality of radio bearers corresponding to the plurality of data units.

A protocol structure of the relay terminal may include a PC5 physical (PC5-PHY) layer, a PC5 media access control (PC5-MAC) layer, and a PC5-RLC layer corresponding to a sidelink with each of the plurality of remote terminals, and a Uu-PHY layer, a Uu-MAC layer, a Uu-RLC layer, and an adaptation layer corresponding to a Uu link with the base station, and a multiplexing operation on the plurality of data units may be supported by the adaptation layer.

According to another exemplary embodiment of the present disclosure for achieving the above-described objective, a communication method, performed by a base station in a communication system, may comprise: receiving, from a core network of the communication system, a plurality of data units to be transmitted to a plurality of remote terminals; generating a multiplexed data unit including identification information of the plurality of remote terminals and the plurality of data units; and transmitting the multiplexed data unit to a relay terminal, wherein the multiplexed data unit is transmitted to the plurality of remote terminals through the relay terminal, and the identification information includes a terminal identifier used to identify each of the plurality of remote terminals.

The generating of the multiplexed data unit may comprise: delivering, by a plurality of first entities supporting functions of a packet data convergence protocol (PDCP) layer included in the base station, the plurality of data units to at least one second entity performing functions of an adaptation layer included in the base station; and generating, by the at least one second entity, the multiplexed data unit including the identification information of the plurality of remote terminals and the plurality of data units.

The identification information may be defined by a third entity supporting functions of a radio resource control (RRC) layer of the base station whenever each of the plurality of remote terminals is connected to the relay terminal.

A radio bearer for each of the plurality of remote terminals may be independently configured, a first data unit to be transmitted to a first remote terminal among the plurality of remote terminals may correspond to a first radio bearer, a second data unit to be transmitted to a second remote terminal among the plurality of remote terminals may correspond to a second radio bearer, and the identification information may further include a bearer identifier for identifying each of a plurality of radio bearers corresponding to the plurality of data units.

According to yet another exemplary embodiment of the present disclosure for achieving the above-described objective, a relay terminal performing relaying by using sidelink in a communication system may comprise: a processor; a memory electronically communicating with the processor; and instructions stored in the memory, wherein when executed by the processor, the instructions may cause the relay terminal to: receive a plurality of data units from a plurality of remote terminals; generate a multiplexed data unit including identification information of the plurality of remote terminals and the plurality of data units; and transmit the multiplexed data unit to a base station, wherein the identification information includes a terminal identifier used to identify each of the plurality of remote terminals.

The instructions may further cause the relay terminal to: deliver, by a plurality of first entities supporting functions of a radio link control (RLC) layer included in the relay terminal, the plurality of data units to a second entity performing functions of an adaptation layer included in the relay terminal; and generate, by the second entity, the multiplexed data unit including the identification information of the plurality of remote terminals and the plurality of data units.

A radio bearer for each of the plurality of remote terminals may be independently configured, a first data unit of a first remote terminal among the plurality of remote terminals may correspond to a first radio bearer, a second data unit of a second remote terminal among the plurality of remote terminals may correspond to a second radio bearer, and the identification information may further include a bearer identifier for identifying each of a plurality of radio bearers corresponding to the plurality of data units.

A protocol structure of the relay terminal may include a PC5 physical (PC5-PHY) layer, a PC5 media access control (PC5-MAC) layer, and a PC5-RLC layer corresponding to a sidelink with each of the plurality of remote terminals, and a Uu-PHY layer, a Uu-MAC layer, a Uu-RLC layer, and an adaptation layer corresponding to a Uu link with the base station, and an operation of obtaining the plurality of data units from the multiplexed data unit may be supported by the adaptation layer.

According to exemplary embodiments of the present disclosure, through a relaying method and a relaying apparatus using sidelink communication between terminals in a wireless communication system, services of a base station or communication network may be reliably provided even to a terminal that does not smoothly perform direct communication with the base station.

According to exemplary embodiments of the present disclosure, protocol stacks capable of improving a relaying performance of a relay terminal performing a relay role between a base station and one or more remote terminals by using sidelink communication in a wireless communication system, and a relaying method and an apparatus according thereto may be provided.

BRIEF DESCRIPTION OF DRAWINGS

FIGS. 10A to 10H are exemplary diagrams for describing exemplary embodiments of a user plane or control plane protocol structure for supporting a relay function in a wireless communication system.

FIGS. 11A and 11B are exemplary diagrams for describing exemplary embodiments of a one-to-one mapping or one-to-many mapping method by a relay terminal in a wireless communication system.

DETAILED DESCRIPTION OF THE EMBODIMENTS

Figure 1:
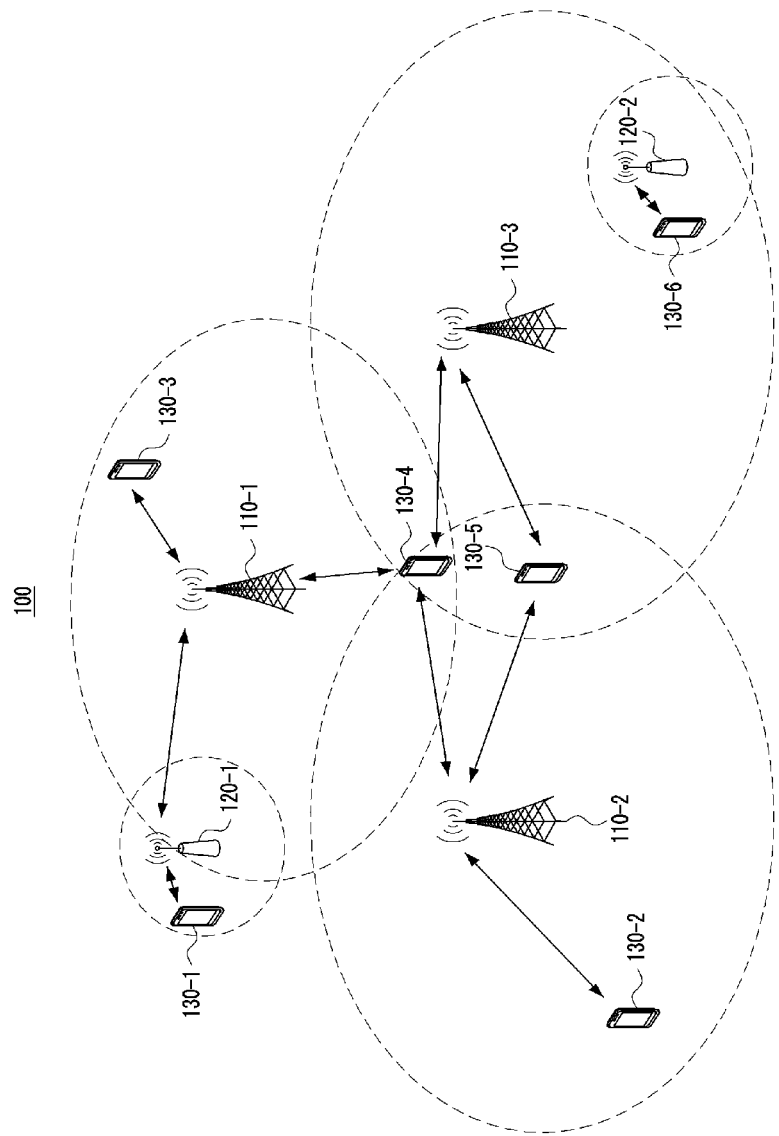
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present specification, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present specification, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports 4G communication, the core network may comprise a serving gateway (S-GW), a packet data network (PDN) gateway (P-GW), a mobility management entity (MME), and the like. When the communication system 100 supports 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
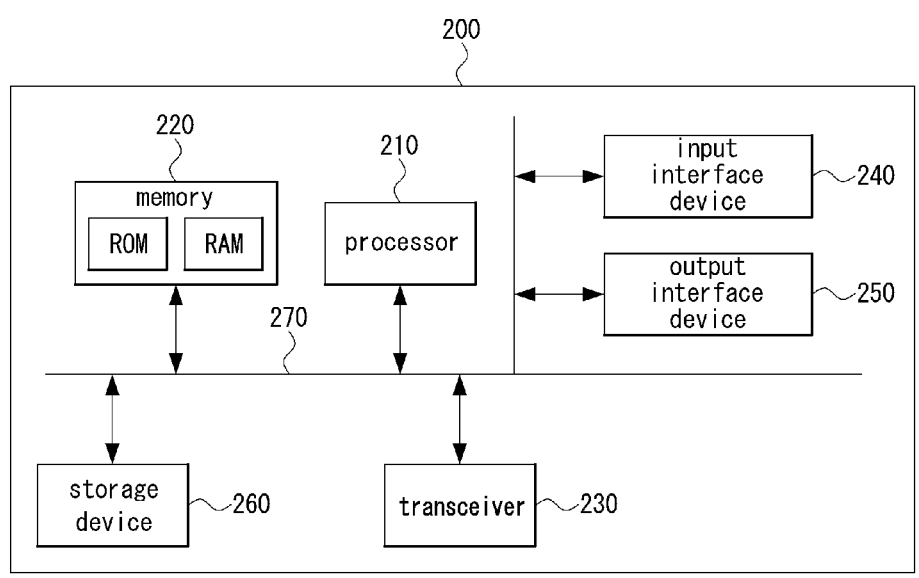
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring radio interfaces and methods for managing the radio interfaces in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the communication system, a base station may perform all functions of a communication protocol (e.g., remote radio transmission/reception function, baseband processing function, etc.). Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), a radio unit (RU), or a transmission point (TP). The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. A communication system configured with backhaul links and fronthaul links may be as follows. When a functional split scheme of the communication protocol is applied, the TRP may selectively perform some functions of the BBU or some functions of medium access control (MAC) and/or radio link control (RLC) layers.

Figure 3:
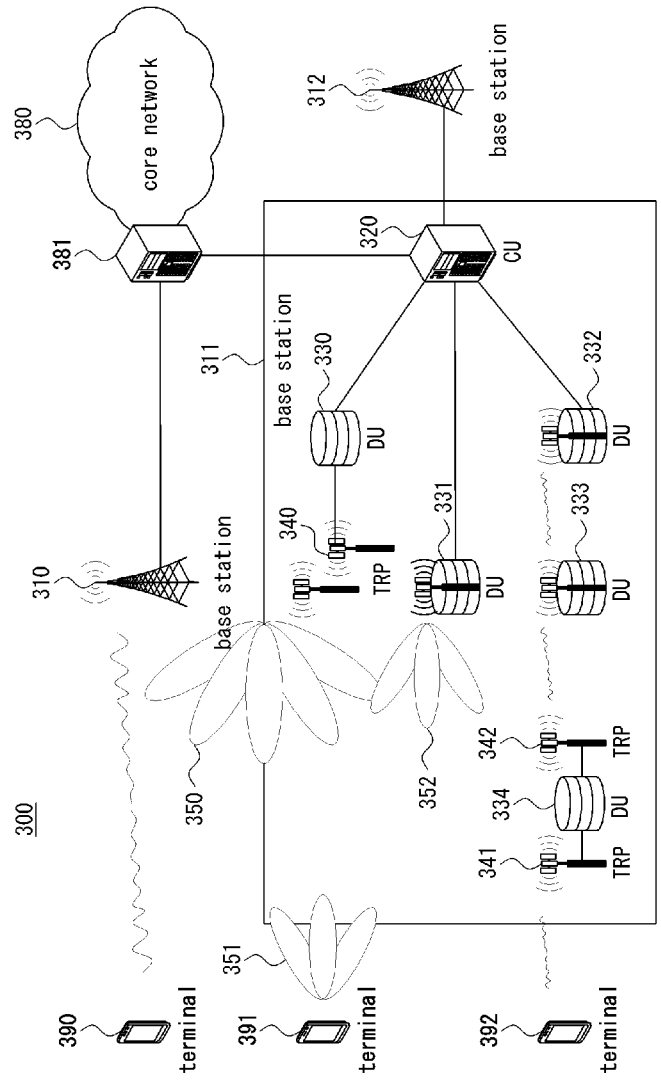
FIG. 3 is a conceptual diagram illustrating an exemplary embodiment of connection between base stations and a core network in a wireless communication network using a base station having a distributed structure.

FIG. 3 is a conceptual diagram illustrating an exemplary embodiment of connection between base stations and a core network in a wireless communication network using a base station having a distributed structure.

Referring to FIG. 3, in a mobile communication network 300, base stations 310, 311, and 312 may be connected with a termination node 381 of a core network 380 through a backhaul link, and may bi-directionally deliver data exchanged among a plurality of terminals 390, 391, and 392 and the core network 380. The core network 380 may correspond to a 4G core network supporting 4G communication or a 5G core network supporting 5G communication. Here, the core network 380 supporting 4G communication may include an MME, S-GW, P-GW, and the like. The core network 380 supporting 5G communication may include an AMF, UPF, P-GW, and the like.

Here, the termination node 381 of the core network 380 may provide a user plane function for exchanging packets with the plurality of terminals 390, 391, and 392 and a control plane function for managing access and mobility of the terminals. The user plane function may be implemented by a serving gateway (SGW) or a user plane function (UPF). The control plane function may be implemented by a mobility management entity (MME) or an access and mobility management function (AMF). The exemplary embodiments of the present disclosure to be described below are not limited to the specific terms 'SGW', 'UPF', 'MME', or 'AMF', and the above terms may be replaced with other terms according to a radio access protocol according to a radio access technology (RAT) and components of a core network supporting the radio access protocol.

The base station 311 composed of a set of devices that distributedly perform functions of the radio access protocol may be configured with a central unit (CU) having centralized functions, a plurality of distributed units (DUs) 330, 331, 332, 333, and 334 having distributed functions, and a plurality of transmission and reception points (TRPs) 340, 341, and 342 transmitting and receiving signals. In FIG. 3, only the base station 311 is shown as a base station having the distributed structure, but the remaining base stations 310 and 312 may also be configured similarly to the base station 311 having the distributed structure.

The CU 320 including upper functions of the radio access protocol may be connected with the plurality of DUs 330, 331, 332, 333, and 334 towards radio sections, may be connected with the termination node 381 towards the core network 380, and may be connected with the plurality of adjacent base stations 310 and 312. Each of the plurality of DUs 331, 332, and 333 including lower functions of the radio access protocol may be connected with a plurality of transmission and reception points located in the same locations, and each of the plurality of DUs 330 and 334 may be connected with the plurality of transmission and reception points 340, 341, and 342 located in the different locations.

Each of the plurality of base stations 310, 311, and 312 may include a plurality of transmission and reception points for transmitting and receiving radio signals, and may use data detected in the signal transmitted ad received by these transmission and reception points. Each of the plurality of transmission and reception points 331, 332, 333, 340, 341, and 342 may be operated independently or may be operated in cooperation with adjacent transmission and reception points. Each of the plurality of transmission and reception points 331, 332, 333, 340, 341, and 342 may use a plurality of beams (e.g., 350 and 352) formed through a beamforming function using multiple antennas to transmit and receive signals to and from a counterpart communication node without interferences. Each of the plurality of transmission and reception points 331, 332, 333, 340, 341, and 342 may be referred to as a remote radio transceiver, a remote radio head (RRH), a radio antenna, a transmission point (TP), a transmission and reception point (TRP), or the like.

Each of the plurality of DUs 330, 331, 332, 333, and 334 may be connected to a communication node towards the core network 380 by wire or wirelessly. When connected by wire, each of the plurality of DUs 330, 331, and 332 may configure some functions of the base station radio access protocol in a radio section to provide radio access, and may be connected to the CU 320 in a wired section. When connected wirelessly, each of the plurality of DUs 333 and 334 may configure some functions of the base station radio access protocol in a radio section to provide radio access, and configure some functions of the terminal radio access protocol in a radio section, thereby being bi-directionally connected to the CU 320 by wirelessly accessing a relay device towards the CU 320.

For example, the DU 333 may wirelessly connect to the DU 332 towards the CU 320, and the DU 332 may be a relay device relaying a connection between the DU 333 and the CU 332. The DU 334 may wirelessly connect to the DU 333 towards the CU 320, and the DU 333 may be a relay device relaying a connection between the DU 334 and the CU 332. The plurality of transmission and reception points 341 and 342 connected to the DU 334 may form a beam or may be configured in a region where interferences are reduced by a physical method. The transmission and reception point 341 may configure some functions of the base station radio access protocol, and the transmission and reception point 342 may configure some functions of the terminal radio access protocol.

Each of the plurality of beams 350, 351, and 352 formed by the plurality of communication nodes may exchange signals with a paired (configured) beam of a counterpart node. To this end, each of the communication nodes may search for a beam by measuring a reception intensity for each beam of the counterpart communication node, configure the selected beam, and change the beam configured in the communication node. By changing the beam of the communication node, the radio channel quality can be maintained in response to a change in the radio channel state or a radio channel change due to the movement of the communication node.

Hereinafter, a structure of a radio access protocol that provides radio access between a base station and a terminal in a mobile communication network and a function of each layer will be described. The following description of the structure and function of each layer of the radio access protocol is merely an example for convenience of description of the exemplary embodiments of the present disclosure, and is not intended to limit the exemplary embodiments of the present disclosure. The exemplary embodiments of the present disclosure may include the concept of the proposed technology and may include changes or substitutions thereof in the scope.

The radio access protocol may provide functions for a plurality of communication nodes to exchange data and control information by utilizing radio resources in a radio section, and may be configured hierarchically. In cellular communication (e.g., LTE, LTE-Advanced (LTE-A), NR, and/or the like which are 3GPP specifications), the radio access protocol may be composed of 1) a radio layer 1 (RL1) configuring physical signals, 2) a radio layer 2 (RL2) that controls radio transmission in radio resources shared by a plurality of communication nodes, and transmits and converges data to a counterpart node, 3) a radio layer 3 (RL3) that performs radio resource control, such as network information sharing, radio connection management, mobility management, and quality of service (QoS) management, for a plurality of communication nodes participating in a wireless network.

The radio layer 1 may be a physical layer and may provide functions for data transfer. The radio layer 2 may be composed of sublayers such as a medium access control (MAC) layer, radio link control (RLC) layer, packet data convergence protocol (PDCP) layer, service data adaptation protocol (SDAP) layer, and/or the like. The radio layer 3 may be a radio resource control (RRC) layer and may provide access stratum (AS) layer control functions.

In an exemplary embodiment of a wireless communication system, a base station connected to a communication network may provide a wireless connection to a stationary or moving terminal within a predetermined radio coverage or cell coverage. The terminal may be bi-directionally connected to the communication network by exchanging data with the connected base station bi-directionally. When the terminal moves and communication with the existing base station is not smooth, the connection with the communication network may be maintained by changing the access base station through a handover operation. The base station may perform a role of proactively managing resources in the radio coverage that provides the connection to the terminal. The terminal managed by the base station may exchange data with the base station in processes of transmitting and receiving radio signals in allowed resources. One or more TRPs may be apparatuses for transmitting and receiving radio signals to and from the terminal, and may constitute a part of the base station. One or more TRPs may constitute a base station at the same location or at distributed locations. The base station may be configured in a manner in which radio access functions are centralized or in a manner in which the radio access functions are distributed. The base station whose radio access functions are distributed may be composed of a central unit (CU) providing upper functions and a distributed unit(s) (DU(s)) providing lower functions.

The terminal may transmit and receive a radio signal to and from the cell provided by the base station in the radio section. The terminal may transmit and receive data to and from the cell of the base station by using the radio access protocol in which the radio access functions are hierarchically configured. A service packet generated in a service layer may be transmitted to a counterpart through the radio access protocol. The base station may split the radio access protocol into functional units, and may be configured as a set of the split functional units. The radio access functions provided by the radio access protocol may generally use a single frequency band, and may configure a bandwidth part within the band. As a scheme of using multiple frequencies, carrier aggregation (CA), dual connectivity (DC), and/or the like may be used according to a configuration scheme of the radio access protocol.

Meanwhile, a communication node such as a terminal or a base station using an unlicensed band may perform a listen before talk (LBT) function. For communication in an unlicensed band, the LBT function may be added to radio access specifications and functions used in a radio access section of a licensed band. A communication node operating according to the LBT function may identify whether a signal from another communication node is received or measured before transmitting a transmission signal in an unlicensed band. The communication node operating according to the LBT function may be configured to transmit a transmission signal only when a signal from another communication node is not received or measured in an unlicensed band. In other words, the communication node operating according to the LBT function may operate so as not to transmit a transmission signal when a signal from another communication node is received or measured in an unlicensed band. The LBT function may be used to meet radio wave regulations of unlicensed bands. A priority may be set for traffic transmitted in an unlicensed band channel according to characteristics or a type of the traffic, and channel access may be performed according to the set priority. A priority class (i.e., LBT priority class) may be set, and channel access may be performed based on parameters determined for each set class. A communication node selecting a predetermined priority class for channel access may select a size of a time period during which a signal is not measured, which is a criterion for determining whether to transmit a signal according to the LBT function.

Meanwhile, in a radio communication environment, terminals adjacent to each other may perform communication through a sidelink through a mutual discovery procedure, a procedure of configuring the sidelink with each other, and a procedure of transmitting resource information and data using sidelink resources in the sidelink. The terminals adjacent to each other may perform direct communication through the sidelink, and a sidelink control and configuration procedure may be performed through a function included in the communication network such as a sidelink server.

The base station may be configured in various manners according to the size of coverage providing connections. When radio coverages of base stations providing various coverages are arranged to overlap each other, it is possible to easily provide radio access to terminals within the coverages without interruption. In general, the size of radio coverage provided by the base station may be dependent of a frequency. For example, the size of radio coverage provided by the base station may decrease as the frequency increases. The size of radio coverage in which the base station provides services may be limited. In addition, the radio coverage in which the base station provides services may include a shadow area due to obstacles or the like. The services of the base station may not be provided outside the radio coverage provided by the base station or in the shadow area.

In an exemplary embodiment of the communication system, a terminal (i.e., remote terminal), which is located outside the radio coverage in which the base station provides services or in the shadow area, may be connected to a relay terminal receiving services from the base station and supporting a relay function through a sidelink, thereby receiving services from the base station indirectly through the relay terminal, and being connected to the communication system. In this case, techniques for effectively performing the relaying operation through the sidelink between the relay terminal and the remote terminal may be required.

Hereinafter, relay methods using a sidelink in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

With respect to the operation of the timer defined or described in the present disclosure, although operations such as start, stop, reset, restart, or expire of the defined timer are not separately described, they mean or include the operations of the corresponding timer or a counter for the corresponding timer.

Figure 4:
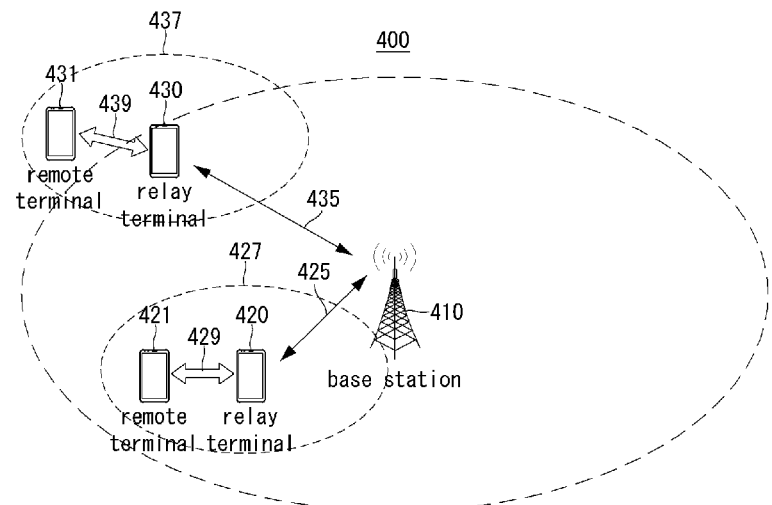
FIG. 4 is a conceptual diagram for describing a first exemplary embodiment of a relaying method using a sidelink in a wireless communication system.

FIG. 4 is a conceptual diagram for describing a first exemplary embodiment of a relaying method using a sidelink in a wireless communication system.

Referring to FIG. 4, a communication system 400 may include one or more base stations (BSs) and one or more terminals (e.g., user equipments (UEs)). The one or more base stations may form cell coverage(s) in a predetermined communicable area to provide services to terminals within the cell coverage(s). Among the one or more terminals, a terminal located within the cell coverage(s) of the one or more base stations may access the communication network and receive services by being connected to the base station (s) forming the cell coverage(s). Alternatively, some of the one or more terminals may not be directly connected to the one or more base stations, but may access the communication network by being indirectly connected to the one or more base stations through relaying of another terminal. In FIG. 4, a communication system including one base station and a plurality of terminals is shown as an example. However, this is only an example for convenience of description, and exemplary embodiments of the present disclosure are not limited thereto.

In an exemplary embodiment, the communication system 400 may include a first base station 410 and a plurality of terminals 420, 421, 430, and 431. The first base station 410 may be configured identically or similarly to the base stations 310, 311, and 312 described with reference to FIG. 3. Each of the plurality of terminals 420, 421, 430, and 431 may be configured identically or similarly to the terminals 390, 391, and 392 described with reference to FIG. 3. Each of the plurality of terminals 420, 421, 430, and 431 may be referred to as the first terminal 420, the second terminal 421, the third terminal 430, the fourth terminal 431, and the like.

The first base station 410 may provide services to terminals within a cell coverage by forming the cell coverage in a predetermined communicable area. For example, among the plurality of terminals 420, 421, 430, and 431 included in the communication system 400, the first to third terminals 420, 421, and 430 located within the cell coverage of the first base station 410 may be connected to the first base station 410 to access the communication network.

On the other hand, some of the plurality of terminals 420, 421, 430, and 431 may not be directly connected to the first base station 410, and may be indirectly connected to the first base station 410 through relaying of another terminal. For example, the fourth terminal 431 may not be directly connected to the first base station 410 because it is located outside the cell coverage of the first base station 410. The fourth terminal 431 may access the network by being indirectly connected to the first base station 410 through relaying of the third terminal 430 connected to the first base station 410. In other words, the third terminal 430 may relay the connection between the first base station 410 and the fourth terminal 431 located within a predetermined communicable area 437. On the other hand, even in case of a terminal located within the cell coverage of the first base station 410, such as the second terminal 421, a situation in which a channel state with the first base station 410 is not excellent may occur due to various reasons. For example, although the second terminal 421 is located within the cell coverage of the first base station 410, direct communication with the first base station 410 may not be easy because it is located in a shadow area caused by buildings, obstacles, or the like. In this case, the second terminal 421 may access the network by being indirectly connected to the first base station 410 through relaying of the first terminal 420 that facilitates direct communication with the first base station 410. In other words, the first terminal 420 may relay the connection between the first base station 410 and the second terminal 421 located within a predetermined communicable area 427.

Here, the first and third terminals 420 and 430 that relay the connection between the second and fourth terminals 421 and 431 and the first base station 410 may referred to as 'relay terminals (UEs)'. On the other hand, the second and fourth terminals 421 and 431 connected to the first base station 410 through relaying of the first and third terminals 420 and 430 may be referred to as 'remote terminals (UEs)'. In an exemplary embodiment of the communication system 400, the connection between the relay terminal and the remote terminal may be configured in a sidelink scheme. For example, the connections between the first and third terminals 420 and 430 that are relay terminals and the second and fourth terminals 421 and 431 that are remote terminals may be configured through PC5 interfaces 429 and 439, respectively. On the other hand, the connections between the first and third terminals 420 and 430 that are relay terminals and the first base station 410 may be configured through Uu interfaces 425 and 435, respectively.

Sidelink and Relay Terminal

In communication between terminals (i.e., device-to-device (D2D) communication), the terminals may be connected to each other through a sidelink to perform communication such as data transmission and reception. Radio signal transmission/reception in the sidelink may be performed in such a manner that a receiving terminal receives a radio signal transmitted by a corresponding transmitting terminal.

In an exemplary embodiment of the communication system, a plurality of terminals may perform sidelink communication by using the same or different radio frequencies or the same radio frequency band. The plurality of terminals may perform the sidelink communication by using the same or different radio resources. A transmitting terminal may provide control information such as radio resource information to a receiving terminal prior to data transmission.

The function of the sidelink communication in the wireless communication network may be configured with an interface between terminals performing the sidelink communication and an interface with a sidelink server controlling the sidelink communication of the terminals. Here, the sidelink server may exchange or provide information related to the sidelink communication by exchanging messages with the terminal. The sidelink server may correspond to a base station or may be connected to the terminal through the base station. For example, the base station may be located on a path between the sidelink server and the terminal, and may mutually transmit packets exchanged between the sidelink server and the terminal. In an exemplary embodiment of the sidelink communication, the connection between the terminals may be configured through a PC5 interface, and the connection between the terminal and the sidelink server may be configured through a PC3 interface or a Uu interface.

A sidelink may be configured between a pair of terminals adjacent to each other. In order to configure sidelink communication, an operation of selecting or discovering adjacent terminals in advance may be required. The terminal may transmit/receive a radio signal for discovering adjacent terminals in order to perform sidelink communication. In an exemplary embodiment of the communication system, the first terminal may transmit a discovery signal for discovering adjacent terminals in a broadcast manner. Here, the discovery signal may include information related to the first terminal, such as identification information of the first terminal. The second terminal adjacent to the first terminal may receive the discovery signal transmitted from the first terminal. The second terminal may transmit a response to the discovery signal based on the discovery signal from the first terminal. When the first terminal transmits a response(s) to the response(s) to the discovery signal(s) from one or more adjacent terminals such as the second terminal, the discovery procedure of the first terminal for the adjacent terminals may be completed. The terminal having discovered adjacent terminal(s) may report information on the discovered adjacent terminal(s) to the sidelink server. Alternatively, each terminal may report information related to its own location to the sidelink server. The sidelink server may identify information on the mutually adjacent terminals based on the report from each terminal. For example, based on the discovery result information or location information included in the report from the connected first terminal, the sidelink server may identify information on the second terminal adjacent to the first terminal, or information that the first terminal and the second terminal are in a mutually adjacent relationship.

In sidelink communication, a transmitting terminal may transmit control information including information on resources allocated for data transmission to a receiving terminal. The transmitting terminal may transmit data to the receiving terminal based on information on the resources allocated for data transmission included in the control information. A resource for the transmitting terminal to perform sidelink data transmission to the receiving terminal may be determined by the transmitting terminal or the base station.

Radio resources used in the sidelink may be operated in units of a channel according to their use. For example, physical channels of sidelink may include a physical sidelink broadcast channel (PSBCH), a physical sidelink control channel (PSCCH), a physical sidelink shared channel (PSSCH), a physical sidelink feedback channel (PSFCH), and the like. Here, the PSBCH may refer to a channel for transmitting broadcast information through a sidelink. The PSCCH may refer to a channel for transmitting sidelink control information. Here, the sidelink control information may include, for example, a sidelink primary synchronization signal (S-PSS) and a sidelink secondary synchronization signal (S-SSS) including a synchronization signal, and a channel state information reference signal (CSI-RS) for sidelink channel measurement. The PSSCH may refer to a channel for transmitting sidelink data. The PSFCH may refer to a channel transmitted by the receiving terminal for feedback to the sidelink data transmitted from the transmitting terminal. For example, the receiving terminal receiving the data transmitted through the sidelink may transmit, to the transmitting terminal, a feedback signal based on whether the reception is successful. The PSFCH may be used independently by one terminal or shared by a plurality of terminals.

A relay terminal may relay radio signals such as control signals and data between the communication network and a remote terminal. The relay terminal and the remote terminal may be connected through a PC5 interface of the sidelink to perform mutual radio signal transmission and reception. On the other hand, the relay terminal and the base station may be connected through a Uu interface to perform mutual radio signal transmission and reception. For example, the relay terminal may transmit a downlink (DL) radio signal transmitted from the base station or the communication network through the Uu interface to the remote terminal through the PC5 interface. On the other hand, the relay terminal may transmit an uplink (UL) radio signal transmitted from the remote terminal through the PC5 interface to the base station or the communication network through the Uu interface.

Figure 5:
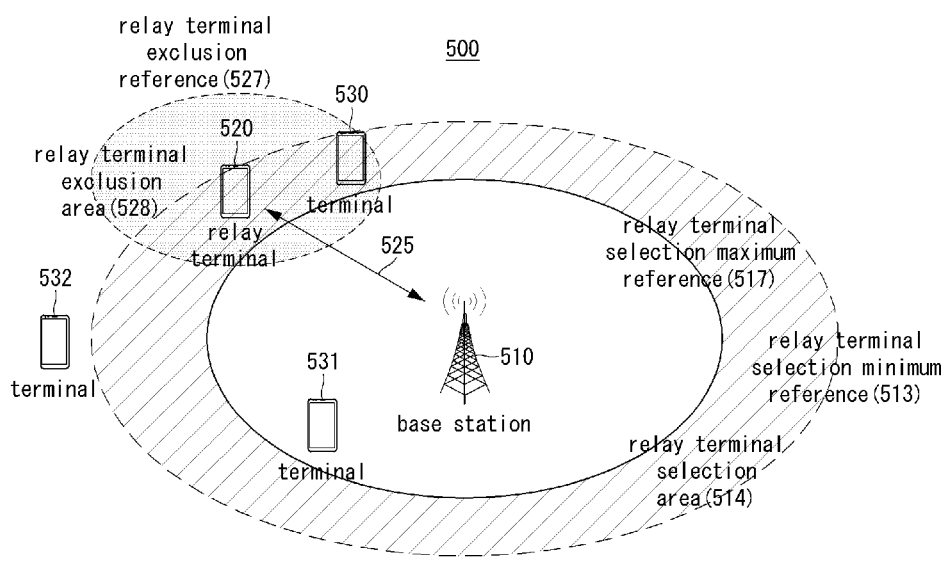
FIG. 5 is a conceptual diagram illustrating a first exemplary embodiment of a method for selecting a relay terminal using a sidelink in a wireless communication system.

FIG. 5 is a conceptual diagram illustrating a first exemplary embodiment of a method for selecting a relay terminal using a sidelink in a wireless communication system.

Referring to FIG. 5, a communication system 500 may include one or more base stations and one or more terminals. In FIG. 5, a communication system including one base station and a plurality of terminals is shown as an example. However, this is only an example for convenience of description, and exemplary embodiments of the present disclosure are not limited thereto.

In an exemplary embodiment, the communication system 500 may include a first base station 510 and a plurality of terminals 520, 530, 531, and 532. The first base station 510 may be configured identically or similarly to the first base station 410 described with reference to FIG. 4. Each of the plurality of terminals 520, 530, 531, and 532 may be configured identically or similarly to the terminals 420, 421, 430, and 431 described with reference to FIG. 4. Each of the plurality of terminals 520, 530, 531, and 532 may be referred to as the first terminal 520, the second terminal 530, the third terminal 531, the fourth terminal 532, and the like.

The first base station 510 may provide services to terminals within a cell coverage by forming the cell coverage in a predetermined communicable area. For example, among the plurality of terminals 520, 530, 531, and 532 included in the communication system 500, the terminals located within the cell coverage of the first base station 510 may be connected to the first base station 410 to access the communication network. On the other hand, at least some of the plurality of terminals 520, 530, 531, and 532 may not be directly connected to the first base station 510, and may be indirectly connected to the first base station 510 through relaying of another terminal serving as a relay. At least some of the plurality of terminals 520, 530, 531, and 532 may include a relay function to perform a relay role between the first base station 510 and another terminal. A terminal performing a relay role between the first base station 510 and another terminal may be referred to as a 'relay terminal (UE)'. On the other hand, a terminal connected to the first base station 510 through relaying of the relay terminal may be referred to as a 'remote terminal (UE)'.

Relay Terminal Configuration Base on Radio Channel State

When it is difficult for a specific terminal to exchange data through direct communication with a base station, relaying through a relay terminal may be required. For example, a relay role of a relay terminal may be required in a vicinity of an edge of a cell coverage or service area formed by a base station, or in a vicinity of a shadow area generated due to a building or an obstacle. A terminal including a relay function may perform a relay terminal configuration procedure with the base station in order to perform a relay role for a remote terminal as a relay terminal.

For example, the relay function of the terminal including the relay function may be activated based on a measured value such as a signal strength of a signal received from the base station. In other words, the terminal including the relay function may detect a situation in which a role as a relay terminal is required based on a measured value of a signal from the base station. Alternatively, the relay terminal may identify that a role as a relay terminal is required based on an indication or command from the base station. The terminal including the relay function may be configured as a relay terminal through a relay terminal configuration procedure in a situation in which a role as a relay terminal is required.

In an exemplary embodiment of the communication system, the terminal including the relay function may determine whether to perform relay terminal configuration based on the determination result of a radio channel state between the base station and the terminal. Here, the determination of the radio channel state between the base station and the terminal may be performed based on measured values such as a reference signal received power (RSRP), a reference signal received quality (RSRQ), and/or a received signal strength indicator (RSSI) for a signal received from the base station. The terminal may compare the measured value of the signal received from the base station with a preset relay terminal selection reference value or relay terminal selection reference range. The terminal may determine whether to perform relay terminal configuration by comparing the measured value of the signal received from the base station with the preset relay terminal selection reference value.

For example, when the measured value of the signal received from the base station is less than the relay terminal selection reference value, the terminal may determine that the relay terminal configuration is required. When the channel state with the base station is not good compared to a predetermined reference, it may be considered that the terminal is located in a vicinity of an edge of the service area of the base station. In other words, when the channel state with the base station is not good compared to the predetermined reference, the terminal may determine that it is in a situation suitable for performing a relay role for another terminal that is not easy to communicate directly with the base station, in a vicinity of the edge of the service area of the base station.

Alternatively, when the measured value of the signal received from the base station is included in the relay terminal selection reference range according to a preset maximum reference value and a minimum reference value, the terminal may determine that the relay terminal configuration is required. In other words, when the measured value of the signal received from the base station is less than or equal to the preset maximum reference value and greater than or equal to the minimum reference value, the terminal may determine that the relay terminal configuration is required. If the measured value of the signal received from the base station is greater than the preset maximum reference value, it can be seen that the terminal is located closer to a central region rather than vicinity of the edge of the service area of the base station. In this case, since a channel state with another terminal, which is located outside the service area of the base station and requires relaying, is poor, the terminal may not be appropriate to serve as a relay terminal. On the other hand, if the measured value of the signal received from the base station is less than the preset minimum reference value, the terminal may be located outside the service area of the base station, or the radio channel state between the terminal and the base station may not be as good as that the terminal can serve as a relay. That is, in this case, although the channel state with another terminal requiring relaying may be good, the channel state with the base station is not good, and thus it may not be appropriate to serve as a relay terminal.

Referring again to FIG. 5, in an exemplary embodiment of the communication system 500, each of the terminals 520, 530, 531, and 532 may determine whether to perform relay terminal configuration based on one or more preset reference values or one or more preset reference ranges. For example, each terminal may determine whether to perform relay terminal configuration based on a preset minimum reference value and a preset maximum reference value. Here, the minimum reference value may be referred to as a 'relay terminal selection minimum reference value'. The maximum reference value may be referred to as a 'relay terminal selection maximum reference value'. Here, the minimum reference value and the maximum reference value may be set identically or differently for each terminal. FIG. 5 shows an exemplary embodiment in which the minimum reference value and the maximum reference value for determining whether to perform relay terminal configuration are set to the same values for all terminals. However, this is only an example for convenience of description and exemplary embodiments of the present disclosure are not limited thereto. For example, the minimum reference value and the maximum reference value may be set to different values according to capabilities or configurations of the respective terminals, such as reception signal detection capability, transmission signal transmission strength, relay function, and/or the like.

A minimum reference boundary 513 and a maximum reference boundary 517 may be formed based on the minimum reference value and the maximum reference value for determining whether to perform relay terminal configuration. An area between the minimum reference boundary 513 and the maximum reference boundary 517 may be regarded as a relay terminal selectable area or relay terminal selection area 514. When a measured value of a signal received by a specific terminal from the first base station 510 is greater than or equal to the minimum reference value and less than or equal to the maximum reference value, the terminal may be considered to be located in the relay terminal selection area 514. For example, in the situation shown in FIG. 5, the first and second terminals 520 and 530 may be considered as being located in the relay terminal selection area 514 between the minimum reference boundary 513 and the maximum reference boundary 517. In other words, measured values of signals received by the first and second terminals 520 and 530 from the first base station 510 may be considered as being greater than or equal to the minimum reference value and less than or equal to the maximum reference value. The third terminal 531 may be considered as being located inside the maximum reference boundary 517. In other words, a measured value of a signal received by the third terminal 531 from the first base station 510 may be considered as being greater than the maximum reference value. On the other hand, the fourth terminal 532 may be considered as being located outside the minimum reference boundary 513. In other words, a measured value of a signal received by the fourth terminal 532 from the first base station 510 may be considered as being less than the minimum reference value.

The third terminal 531 having the measured value of the signal received from the first base station 510, which is greater than the maximum reference value, and the fourth terminal 532 having the measured value of the signal received from the first base station 510, which is less than the minimum reference value, may be determined as being not suitable for performing a role of a relay terminal. On the other hand, the first and second terminals 520 and 530 having the measured values of the signals received from the first base station 510, which are between the minimum reference value and the maximum reference value, may be determined to be appropriate to serve as a relay terminal.

The first and/or second terminals 520 and 530 determined to be suitable for performing a role of a relay terminal may perform a role as a relay terminal through a relay terminal configuration procedure. For example, the first and/or second terminals 520 and 530 may initiate the relay terminal configuration procedure by transmitting a message requesting relay terminal configuration to the first base station 510. The first base station 510 may determine whether to configure each terminal that has transmitted the message requesting relay terminal configuration as a relay terminal. When the first base station 510 approves the relay terminal configuration, the corresponding terminal may be configured as a relay terminal. On the other hand, when the first base station 510 does not approve the relay terminal configuration, the corresponding terminal may not be configured as a relay terminal. The first and/or second terminals 520 and 530 configured as a relay terminal may be respectively connected to another terminal requiring relaying and the first base station 510. For example, the first and/or second terminals 520 and 530 configured as a relay terminal may be connected to the first base station 510 through a Uu interface, and may be connected to another terminal requiring relaying through a PC5 interface for sidelink.

In an exemplary embodiment of the communication system 500, even when a plurality of adjacent terminals satisfy the minimum reference value and the maximum reference value, only one or some of them may operate to perform a relay role. On the other hand, it may be unnecessary or inefficient for two adjacent terminals to perform relay roles. Alternatively, when two adjacent terminals simultaneously perform relay roles, they may interfere with each other due to collision of sidelink resources. Accordingly, the communication system 500 may be configured so that a situation in which a plurality of adjacent terminals simultaneously perform relay roles does not occur. In other words, relay terminals performing relay roles in the communication system 500 may be disposed at least at a predetermined distance from each other. Alternatively, another terminal may not perform a relay terminal configuration procedure near a terminal already configured as a relay terminal in the communication system 500.

For example, when the first terminal 520 completes relay terminal configuration with the first base station 510, other terminals may determine whether they are relay terminal exclusion targets based on radio channel states with the first terminal 520. The first terminal 520 may transmit a relay terminal exclusion message indicating that it has been configured as a relay terminal in a broadcast manner. Another terminal receiving the relay terminal exclusion message transmitted from the first terminal 520 may determine whether or not it is a relay terminal exclusion target based on a result of measurement on the relay terminal exclusion message. Terminals adjacent to the first terminal 520 may operate so as not to be configured as relay terminals based on the relay terminal exclusion message transmitted from the first terminal 520 even when the radio channels with the first base station 510 are good. For the relay terminal exclusion determination, a relay terminal exclusion reference value may be set. Here, the relay terminal exclusion reference value may be set identically or differently for each terminal.

Based on the relay terminal exclusion reference value, a relay terminal exclusion reference boundary 527 may be formed around the first terminal 520 already configured as the relay terminal. The inside of the relay terminal exclusion reference boundary 527 may be considered as a relay terminal exclusion area 528. When a measured value of the relay terminal exclusion message received by a specific terminal from the first terminal 520 is equal to or greater than the relay terminal exclusion reference value, the corresponding terminal may be considered to be located in the relay terminal exclusion area 528. In other words, when the measured value for the relay terminal exclusion message received by the specific terminal from the first terminal 520 is equal to or greater than the relay terminal exclusion reference value, the terminal may be considered as being located inside the relay terminal exclusion reference boundary 527. In this case, the corresponding terminal may be regarded as being too close to the first terminal 520 already configured as the relay terminal and thus may correspond to a relay terminal exclusion target. The terminal corresponding to a relay terminal exclusion target may not operate to be configured as a relay terminal even if a radio channel state with the first base station 510 is good.

On the other hand, when the measured value of the relay terminal exclusion message received by a specific terminal from the first terminal 520 is less than the relay terminal exclusion reference value, the corresponding terminal may be considered as being located outside the relay terminal exclusion reference boundary 527. In this case, the corresponding terminal may be regarded as being sufficiently far from the first terminal 520 already configured as the relay terminal and thus may not correspond to a relay terminal exclusion target. The terminal that does not correspond to a relay terminal exclusion target may operate to be configured as a relay terminal when a radio channel state with the first base station 510 is good.

The configuration related to such the relay terminal exclusion is merely an example for convenience of description, and exemplary embodiments of the present disclosure are not limited thereto. For example, in another exemplary embodiment of the communication system 500, the maximum number of relay terminals that can be operated in the relay terminal selection area of each base station may be set. In this case, even when a certain terminal is included in the relay terminal selection area, if the number of terminals previously configured as relay terminals exceeds the maximum number of relay terminals, the corresponding terminal may be prevented from being configured as a relay terminal. For example, the first base station 510 may transmit information related to the number of terminals configured as relay terminals in the current relay terminal selection area or the number of relay terminals additionally configurable in the current relay terminal selection area to terminals within the cell coverage. Here, a fifth terminal (not shown) included in the relay terminal selection area may identify whether additional relay terminal configuration is possible in the current relay terminal selection area based on the information transmitted from the first base station 510. If additional relay terminal configuration is not possible in the relay terminal selection area at that time, the fifth terminal may determine that it corresponds to a relay terminal exclusion target.

On the other hand, the radio channel state between the terminal already configured as the relay terminal and the base station may not meet the relay terminal configuration reference(s) due to a location movement and/or a change in the radio environment. For example, due to movement of the relay terminal or movement of an obstacle on a communication path, a situation in which the radio channel state becomes less than the minimum reference value or greater than the maximum reference value may occur. In this manner, when the radio channel state between the relay terminal and the base station does not meet the relay terminal configuration reference(s), a relay terminal release procedure may be performed. However, this is only an example for description of the present disclosure, and exemplary embodiments of the present disclosure are not limited thereto. For example, the relay terminal may determine whether to perform a relay terminal release procedure based on relay terminal release reference(s) defined differently from the relay terminal configuration reference(s).

In an exemplary embodiment of the communication system 500, the first terminal 520 configured as the relay terminal may move in the direction of the first base station 510 so as to be located inside the relay terminal selection maximum reference boundary 517, or may move in the opposite direction of the first base station 510 so as to be located outside the relay terminal selection minimum reference boundary 513. As such, when the first terminal 520 leaves the relay terminal selection area 514, a relay terminal release procedure for the first terminal 520 may be performed. The first terminal 520 may report a measured value of a radio channel with the first base station 510 to the first base station 510. The first terminal 520 may initiate a relay terminal release procedure by transmitting a message requesting relay terminal release to the first base station 510. The first base station 510 may determine whether to perform relay terminal release with respect to the first terminal 520 that has transmitted the relay terminal release request message. When the first base station 510 approves the relay terminal release, the corresponding terminal may be released from the relay terminal and may not perform the relay role. On the other hand, when the first base station 510 does not approve the relay terminal release, the corresponding terminal may continue to perform the relay role. When the relay terminal release is approved by the first base station 510, at least part of a connection 525 between the first terminal 510 and the first base station 510 and a connection between the first terminal 510 and a remote terminal may be released.

In another exemplary embodiment of the communication system 500, when the radio channel state with the first base station 510 does not meet the relay terminal configuration reference(s), the first terminal 520 may determine relay terminal release according to its own determination. In this case, the first terminal 520 may transmit a message reporting the relay terminal release decision to the first base station 510. When the first terminal 520 determines to perform relay terminal release, at least a part of the connection 525 between the first terminal 520 and the first base station 510 and a connection between the first terminal 520 and a remote terminal may be released.

When the relay terminal release procedure is performed, the first terminal 520, which was the relay terminal, may transmit a message indicating that the relay terminal release has been performed in a broadcast manner. Through this, the second terminal 530, which has previously been the relay terminal exclusion target based on the relay terminal exclusion message from the first terminal 520, may be excluded from the relay terminal exclusion targets. In this case, the second terminal 530 may perform a relay terminal configuration procedure based on a radio channel state with the first base station 510.

The reference values such as the minimum relay terminal selection reference value, the relay terminal selection maximum reference value, and the relay terminal exclusion reference value described with reference to FIG. 5 may be commonly and fixedly applied to terminals of the communication system 500. Alternatively, each terminal may operate based on reference values set differently according to the capability or configuration of each terminal. Alternatively, each terminal may operate based on reference values dynamically indicated by the base station or the already-configured relay terminal. For example, the first base station 510 may determine the minimum relay terminal selection reference value, the relay terminal selection maximum reference value, the relay terminal exclusion reference value, etc. statically or dynamically according to a communication situation, and indicate them through a predetermined broadcast message. The first terminal 520 may statically or dynamically determine the relay terminal exclusion reference value for determining terminals to be excluded from relay terminals based on itself, and may indicate it through a relay terminal exclusion message.

Figure 6:
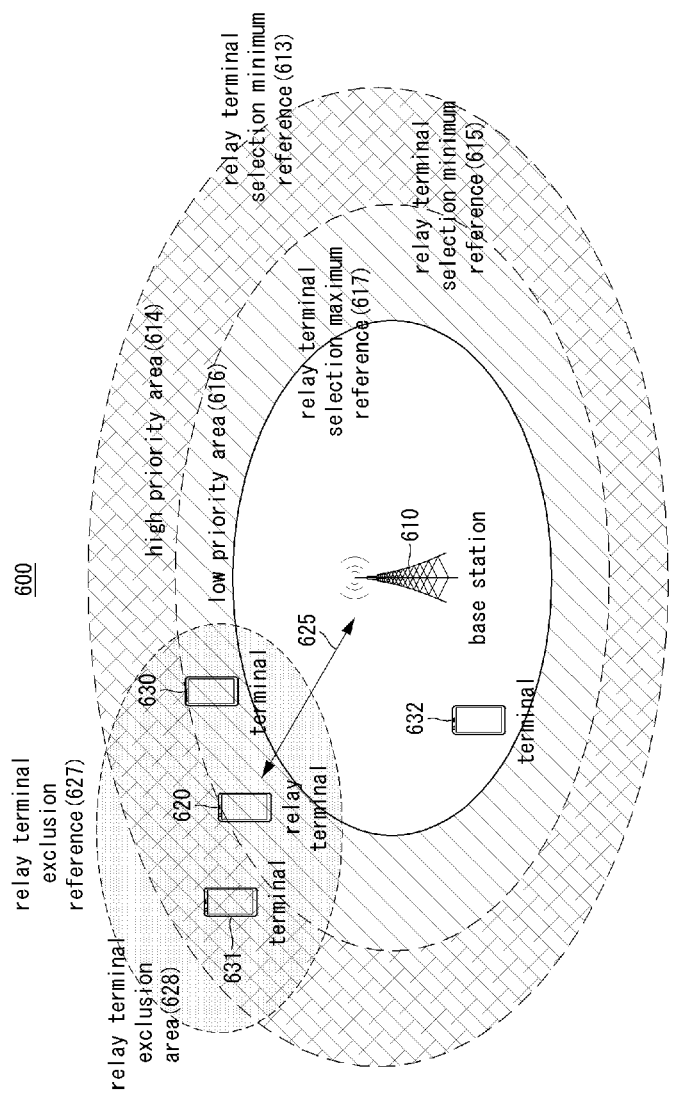
FIG. 6 is a conceptual diagram illustrating a second exemplary embodiment of a method for selecting a relay terminal using a sidelink in a wireless communication system.

FIG. 6 is a conceptual diagram illustrating a second exemplary embodiment of a method for selecting a relay terminal using a sidelink in a wireless communication system.

Referring to FIG. 6, a communication system 600 may include one or more base stations and one or more terminals. In FIG. 6, a communication system including one base station and a plurality of terminals is shown as an example. However, this is only an example for convenience of description, and exemplary embodiments of the present disclosure are not limited thereto.

In an exemplary embodiment, the communication system 600 may include a first base station 610 and a plurality of terminals 620, 630, 631, and 632. The first base station 610 may be configured identically or similarly to the first base station 510 described with reference to FIG. 5. Each of the plurality of terminals 620, 630, 631, and 632 may be configured identically or similarly to the terminals 520, 530, 531, and 532 described with reference to FIG. 5. Each of the plurality of terminals 620, 630, 631, and 632 may be referred to as the first terminal 620, the second terminal 630, the third terminal 631, the fourth terminal 632, and the like. Hereinafter, in describing a second exemplary embodiment of a method for selecting a relay terminal using a sidelink in a wireless communication system with reference to FIG. 6, content overlapping with that described with reference to FIG. 5 will be omitted.

Among the plurality of terminals 620, 630, 631, and 632 included in the communication system 600, the terminals located within the cell coverage of the first base station 610 may be connected to the first base station 610 to access the communication network. On the other hand, at least some of the plurality of terminals 620, 630, 631, and 632 may not be directly connected to the first base station 610, and may be indirectly connected to the first base station 610 through relaying of another terminal serving as a relay. At least some of the plurality of terminals 620, 630, 631, and 632 may include a relay function to perform a relay role between the first base station 610 and another terminal. A terminal performing a relay role between the first base station 610 and another terminal may be referred to as a 'relay terminal (UE)'. On the other hand, a terminal connected to the first base station 610 through relaying of the relay terminal may be referred to as a 'remote terminal (UE)'.

In an exemplary embodiment of the communication system 600, each of the terminals 620, 630, 631, and 632 may determine whether to perform relay terminal configuration based on a plurality of preset reference values or a plurality of preset reference ranges. For example, each terminal may determine whether to perform relay terminal configuration based on one or more preset minimum reference values and one or more maximum reference values for determining whether to perform relay terminal configuration. Here, the one or more minimum reference values may be referred to as 'relay terminal selection minimum reference values'. The one or more maximum reference values may be referred to as 'relay terminal selection maximum reference values'. In FIG. 6, the communication system 600 to which two minimum reference values and one maximum reference value are configured for determining whether to perform relay terminal configuration is shown as an example. However, this is only an example for convenience of description, and exemplary embodiments of the present disclosure are not limited thereto.

In an exemplary embodiment of the communication system 600, based on a first minimum reference value, a second minimum reference value, and a maximum reference value for determining whether to perform relay terminal configuration, a first minimum reference boundary 613, a second minimum reference boundary 615, and a maximum reference boundary 617 may be formed. An area between the first minimum reference boundary 613 and the maximum reference boundary 617 may be regarded as relay terminal selection areas 614 and 616. An area between the first minimum reference boundary 613 and the second minimum reference boundary 615 may be regarded as a high priority area 614. On the other hand, an area between the second minimum reference boundary 615 and the maximum reference boundary 617 may be regarded as a low priority area 616. That is, it can be seen that the relay terminal selection areas 614 and 616 are classified into the high priority area 614 and the low priority area 616 based on the second minimum reference boundary 615.

When a measured value of a signal received by a specific terminal from the first base station 610 is equal to or greater than the first minimum reference value and less than the second minimum reference value, the specific terminal may be considered as being located in the high priority area 614. When a measured value of a signal received by a specific terminal from the first base station 610 is equal to or greater than the second minimum reference value and less than the maximum reference value, the specific terminal may be considered as being located in the low priority area 616. For example, in the situation shown in FIG. 6, the third terminal 631 may be considered as being located in the high priority area 614 between the first minimum reference boundary 613 and the second minimum reference boundary 615. In other words, a measured value of a signal received by the third terminal 631 from the first base station 610 is equal to or greater than the first minimum reference value and less than the second minimum reference value. The first and second terminals 620 and 630 may be considered as being located in the low priority area 616 between the second minimum reference boundary 615 and the maximum reference boundary 617. In other words, measured values of signals received by the first and second terminals 620 and 630 from the first base station 610 are greater than or equal to the second minimum reference value and less than the maximum reference value. The fourth terminal 632 may be considered as being located inside the maximum reference boundary 617. In other words, a measured value of a signal received by the fourth terminal 632 from the first base station 610 may be considered as being greater than the maximum reference value. The fourth terminal 632 that is not located in the relay terminal selection areas including the high priority area 614 and the low priority area 616 may be determined to be not suitable for performing a relay terminal role. On the other hand, the first, second, and third terminals 620, 630, and 631 located in the relay terminal selection areas 614 and 616 may be determined to be suitable for performing a relay terminal role.

The first, second, and/or third terminals 620, 630, and 631 determined to be suitable for performing a relay terminal role may perform a role as a relay terminal through a relay terminal configuration procedure. For example, the first terminal 620 may initiate a relay terminal configuration procedure by transmitting a message requesting relay terminal configuration to the first base station 610. The first base station 610 may determine whether to configure each terminal that has transmitted the message requesting relay terminal configuration as a relay terminal. When the first base station 610 approves the relay terminal configuration, the first terminal 620 may be configured as a relay terminal. The first terminal 620 configured as a relay terminal may be connected respectively to another terminal requiring relaying and the first base station 610. A connection 625 between the first terminal 620 configured as the relay terminal and the first base station 610 may be configured through a Uu interface, and a connection between the first terminal 610 and another terminal requiring relaying may be configured through a PC5 interface for sidelink.

In an exemplary embodiment, the communication system 600 may be configured so that a situation in which a plurality of adjacent terminals perform relay roles at the same time does not occur. In other words, the relay terminals performing relay roles in the communication system 600 may be disposed at least at a predetermined distance from each other. Alternatively, another terminal may not perform a relay terminal configuration procedure in a vicinity of a terminal already configured as a relay terminal in the communication system 600. In addition, the communication system 600 may perform a relay terminal exclusion procedure and/or a relay terminal replacement procedure based on in which of the high priority area 614 and the low priority area 616 constituting the relay terminal selection areas each terminal is located.

For example, when the first terminal 620 completes the relay terminal configuration with the first base station 610, other terminals may determine whether they are relay terminal exclusion targets based on radio channel states with the first terminal 620. The first terminal 620 may transmit a relay terminal exclusion message indicating that it has been configured as a relay terminal in a broadcast manner. The relay terminal exclusion message may include information on which area the first terminal 620 is located in among the high priority area 614 and the low priority area 616 constituting the relay terminal selection areas. That is, in the situation shown in FIG. 6, the relay terminal exclusion message transmitted by the first terminal 620 may include information indicating that the first terminal 620 is located in the low priority area 616.

Another terminal receiving the relay terminal exclusion message transmitted from the first terminal 620 may determine whether or not it is a relay terminal exclusion target based on the relay terminal exclusion message. Based on a predetermined relay terminal exclusion reference value, a relay terminal exclusion reference boundary 627 may be formed around the first terminal 620 already configured as the relay terminal. The inside of the relay terminal exclusion reference boundary 627 may be regarded as a relay terminal exclusion area 628. When a measured value of the relay terminal exclusion message received by a specific terminal from the first terminal 620 is equal to or greater than the relay terminal exclusion reference value, the specific terminal may be considered as being located in the relay terminal exclusion area 628. In this case, the corresponding terminal may be too close to the first terminal 620 already configured as the relay terminal, and thus may be regarded as corresponding to a relay terminal exclusion target. The terminal corresponding to the relay terminal exclusion target may not operate to be configured as a relay terminal even if a radio channel state with the first base station 610 is good. On the other hand, when a terminal receiving the relay terminal exclusion message is in an area having a higher priority than that of the first terminal 620, a relay terminal replacement operation may be performed.

For example, the second terminal 630 may be considered as being located in the relay terminal exclusion area 628 because a measured value of the relay terminal exclusion message received from the first terminal 620 is equal to or greater than the relay terminal exclusion reference value. On the other hand, the second terminal 630 may be considered as being located in the low priority area 614 because the measured value of the signal received from the first base station 610 is equal to or greater than the second minimum reference value and less than the maximum reference value. Based on the relay terminal exclusion message received from the first terminal 620, the second terminal 630 may identify that itself is located in the relay terminal exclusion area 628 of the first terminal 620, and that the first terminal is located in the same low priority area 614 as itself. In this case, the second terminal 630 may determine that itself corresponds to a relay terminal exclusion target.

On the other hand, the third terminal 631 may be considered as being located in the relay terminal exclusion area 628 because a measured value of the relay terminal exclusion message received from the first terminal 620 is equal to or greater than the relay terminal exclusion reference value. Meanwhile, the third terminal 631 may be considered as being located in the high priority area 616 because the measured value of the signal received from the first base station 610 is equal to or greater than the first minimum reference value and less than the second minimum reference value. Based on the relay terminal exclusion message received from the first terminal 620, the third terminal 631 may identify that itself is located in the relay terminal exclusion area 628 of the first terminal 620, and that the first terminal 620 is located in the high priority area 616 having a higher priority than the low priority area 614 in which itself is located. In this case, the third terminal 631 may determine that itself corresponds to a relay terminal replacement target rather than a relay terminal exclusion target. The third terminal 631 corresponding to the relay terminal replacement target may be configured as a relay terminal through a relay terminal replacement procedure, and the first terminal 620, which is the existing relay terminal, may be released from the relay terminal through the relay terminal replacement procedure. The third terminal 631 corresponding to the relay terminal replacement target may perform the relay terminal replacement procedure by transmitting a message requesting relay terminal replacement to the first base station 610 and/or the first terminal 620.

That is, in the second exemplary embodiment of the method for selecting a relay terminal using a sidelink shown in FIG. 6, whether to perform relay terminal configuration may be determined based on a signal that each terminal receives from the base station and an adjacent relay terminal. Based on a signal that each terminal receives from the base station, it may be identified whether the corresponding terminal is located in the relay terminal selection area. The relay terminal selection area may be divided into sub-areas having more specific priorities. A terminal that does not detect a relay terminal exclusion message from an adjacent relay terminal among terminals located in the relay terminal selection area may be configured as a relay terminal. On the other hand, a terminal detecting a relay terminal exclusion message from an adjacent relay terminal may determine whether itself is located in the relay terminal exclusion area based on the relay terminal exclusion message. If it is identified that the corresponding terminal is included in the relay terminal exclusion area, the terminal may identify whether the terminal corresponds to a relay terminal exclusion target or a relay terminal replacement target by performing comparison between priorities of sub-areas in which the relay terminal that has transmitted the relay terminal exclusion message and itself are located. If it is determined that the sub-area in which the relay terminal that has transmitted the relay terminal exclusion message is located has the same priority as the sub-area in which itself is located or has a higher priority than the sub-area in which itself is located, the corresponding terminal may determine that itself corresponds to a relay terminal exclusion target. On the other hand, if it is determined that the sub-area in which the relay terminal that has transmitted the relay terminal exclusion message is located has a lower priority than the sub-area in which itself is located, the corresponding terminal may determine that itself corresponds to a relay terminal replacement target. A terminal corresponding to a relay terminal replacement target may perform a relay terminal replacement procedure by transmitting a message requesting relay terminal replacement, and may be configured as a relay terminal. On the other hand, through the relay terminal replacement procedure, the existing relay terminal may be released from the relay terminal. Through this, the relay terminals may be disposed at least at a predetermined distance from each other, and a terminal located in a sub-area having a higher priority may be preferentially selected as a relay terminal. Accordingly, terminals located in an area where a need for relaying operations is relatively high or in an area where efficiency of relaying operations is relatively high may preferentially perform the relay operation.

Figure 7:
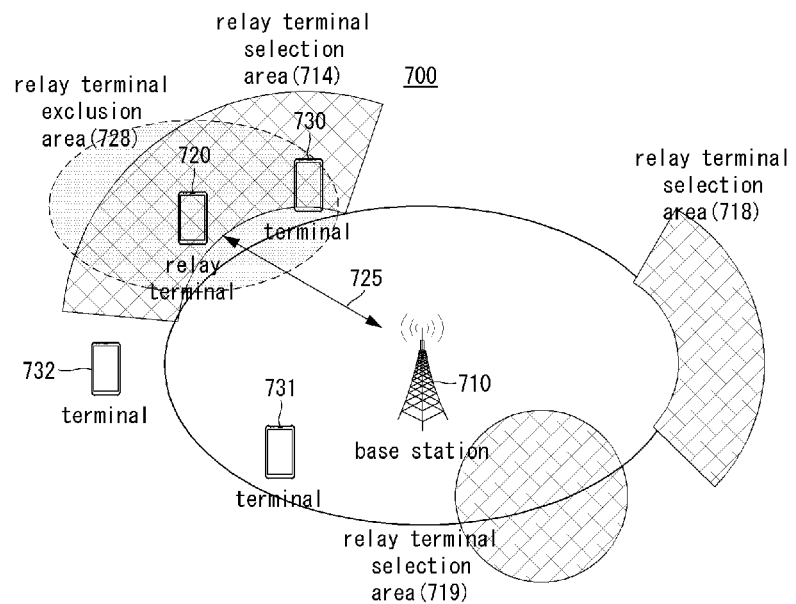
FIG. 7 is a conceptual diagram illustrating a third exemplary embodiment of a method for selecting a relay terminal using a sidelink in a wireless communication system.

FIG. 7 is a conceptual diagram illustrating a third exemplary embodiment of a method for selecting a relay terminal using a sidelink in a wireless communication system.

Referring to FIG. 7, a communication system 700 may include one or more base stations and one or more terminals. In FIG. 7, a communication system including one base station and a plurality of terminals is shown as an example. However, this is only an example for convenience of description, and exemplary embodiments of the present disclosure are not limited thereto.

In an exemplary embodiment, the communication system 700 may include a first base station 710 and a plurality of terminals 720, 730, 731, and 732. The first base station 710 may be configured identically or similarly to the first base station 510 described with reference to FIG. 5. Each of the plurality of terminals 720, 730, 731, and 732 may be configured identically or similarly to the terminals 520, 530, 531, and 532 described with reference to FIG. 5. Each of the plurality of terminals 720, 730, 731, and 732 may be referred to as the first terminal 720, the second terminal 730, the third terminal 731, the fourth terminal 732, and the like. Hereinafter, in describing a third exemplary embodiment of a method for selecting a relay terminal using a sidelink in a wireless communication system with reference to FIG. 7, contents overlapping with those described with reference to FIGS. 5 and 6 will be omitted.

Among the plurality of terminals 720, 730, 731, and 732 included in the communication system 700, the terminals located within the cell coverage of the first base station 710 may be connected to the first base station 710 to access the communication network. On the other hand, at least some of the plurality of terminals 720, 730, 731, and 732 may not be directly connected to the first base station 710, and may be indirectly connected to the first base station 710 through relaying of another terminal serving as a relay. At least some of the plurality of terminals 720, 730, 731, and 732 may include a relay function to perform a relay role between the first base station 710 and another terminal. A terminal performing a relay role between the first base station 710 and another terminal may be referred to as a 'relay terminal (UE)'. On the other hand, a terminal connected to the first base station 710 through relaying of the relay terminal may be referred to as a 'remote terminal (UE)'.

In an exemplary embodiment of the communication system 700, each of the terminals 720, 730, 731, and 732 may determine whether to perform relay terminal configuration based on information on its location information and one or more preset reference locations or one or more reference areas. For example, each terminal may determine whether to perform relay terminal configuration by comparing its own location information with information on one or more reference locations or one or more reference areas preconfigured based on spatial location information in a communication environment for determining whether to perform relay terminal configuration. Here, the one or more reference areas may be referred to as 'relay terminal selection areas'. In FIG. 7, the communication system 700 in which three relay terminal selection areas are configured for determining whether to perform relay terminal configuration is shown as an example. However, this is only an example for convenience of description, and exemplary embodiments of the present disclosure are not limited thereto.

Location-Based Relay Terminal Initialization

In an exemplary embodiment of the wireless communication system, a method of determining whether to activate a relay function based on location information may be applied. In a radio channel signal, an attenuation phenomenon may occur depending on characteristics of an electromagnetic wave as a medium. Accordingly, communication between a base station and a terminal or configuration of a relay terminal may not be easy at a specific location due to the attenuation phenomenon. For example, in a specific location such as a building or near an obstacle in a communication environment, a shadow area in which a radio signal is attenuated a lot may occur. There may be a problem in which a relaying operation by a relay terminal and/or a remote terminal is not smoothly performed in the shadow area.

In order to solve such the problem, in an exemplary embodiment of the wireless communication system, each terminal may operate to determine whether to activate a relay function based on location information. Each terminal may acquire its own location information based on a location information system such as a global positioning system (GPS). Alternatively, each terminal may acquire its own relative location information with respect to one or more base stations through communication with one or more base stations. Each terminal may use the acquired location information to determine whether to perform relay terminal configuration. Each terminal may use the acquired location information as a criterion for determining activation or release of its own relay function.

The base station may set a predetermined reference(s) for location-based relay terminal selection. For example, the base station may configure at least a partial area(s) of the cell coverage it forms as the relay terminal selection area(s). The base station may transmit configuration information of the relay terminal selection area(s) to each terminal within its cell coverage in a broadcast manner. Alternatively, the base station may transmit the configuration information of the relay terminal selection area(s) to each terminal in an access procedure of each terminal.

Each terminal may compare its location information with the configuration information of the relay terminal selection area(s) transmitted from the base station. Each terminal may determine whether its location is included in the relay terminal selection area. A terminal located in the relay terminal selection area may proceed with a relay terminal configuration procedure. On the other hand, a terminal located in a location other than the relay terminal selection area may not be able to proceed with a relay terminal configuration procedure.

On the other hand, when a terminal already configured as a relay terminal based on location information moves from the existing location, it may deviate from the relay terminal selection area. When the relay terminal leaves the relay terminal selection area, a relay terminal release procedure may be performed. However, this is only an example for the description of the present disclosure, and exemplary embodiments of the present disclosure are not limited thereto. For example, the relay terminal may determine whether to perform the relay terminal release procedure based on a relay terminal release area defined differently from the relay terminal configuration area.

On the other hand, in an exemplary embodiment of the communication system, a terminal located in the relay terminal selection area may determine whether or not it is a relay terminal exclusion target based on the same or similar relay terminal exclusion reference(s) as described with reference to FIGS. 5 and 6. For example, among the terminals located in the relay terminal selection area, a terminal whose measured value for a relay terminal exclusion message from an adjacent relay terminal falls below a predetermined relay terminal exclusion reference may determine that it is excluded from the relay terminal.

Alternatively, in another exemplary embodiment of the communication system, each terminal may acquire location information of an adjacent relay terminal from the base station and/or the adjacent relay terminal. Each terminal may calculate a distance between itself and the relay terminal based on the acquired location information of the existing relay terminal. Each terminal may identify whether or not itself is included in the relay terminal exclusion area based on the distance between itself and the relay terminal. If a certain terminal located in the relay terminal selection area is not included in the relay terminal exclusion area due to the existing relay terminal, the corresponding terminal may be configured as a relay terminal. On the other hand, if a certain terminal located in the relay terminal selection area is included in the relay terminal exclusion area due to the existing relay terminal, the terminal may not be configured as a relay terminal because itself corresponds to a relay terminal exclusion target.

Referring to FIG. 7, in an exemplary embodiment of the communication system 700, the first base station 710 may configure one or more relay terminal selection areas 714, 718, and 719. The one or more relay terminal selection areas 714, 718, and 719 may be configured based on location information in a communication area. The one or more relay terminal selection areas 714, 718, and 719 may be configured so that terminals located in a specific location or a specific space within the cell coverage of the first base station 710 are configured as relay terminals. The one or more relay terminal selection areas 714, 718, and 719 may be referred to as the first relay terminal selection area 714, the second relay terminal selection area 718, and the third relay terminal selection area 719, respectively.

The first base station 710 may transmit information of the configured first to third relay terminal selection areas 714, 718, and 719 to the terminals 720, 730, 731, and 732 within the cell coverage. Each of the terminals 720, 730, 731, and 732 receiving the information of the first to third relay terminal selection areas 714, 718, and 719 may identify whether its location is included in a relay terminal selection area by comparing its location information with the information of the first to third relay terminal selection areas 714, 718, and 719. The third and fourth terminals 731 and 732 may identify that their locations are not included in any of the first to third relay terminal selection areas 714, 718, and 719.

On the other hand, the first terminal 720 may identify that its location is included in the first relay terminal selection area 714. When an adjacent relay terminal is not detected at the corresponding time point, the first terminal 720 may be configured as a relay terminal by performing a relay terminal configuration procedure. A connection 725 between the first terminal 720 configured as the relay terminal and the first base station 710 may be configured through a Uu interface, and a connection between the first terminal 720 and another terminal requiring relaying may be configured through a PC5 interface for sidelink.

The second terminal 730 may identify that its location is included in the first relay terminal selection area 714. The second terminal 730 may receive a relay terminal exclusion message transmitted from the first terminal 720 already configured as the relay terminal. Based on the relay terminal exclusion message received from the first terminal 720, the second terminal 730 may identify that itself is included in a relay terminal exclusion area 728 due to the first terminal 720. In this case, the second terminal 730 may determine that itself corresponds to a relay terminal exclusion target and may not perform a relay terminal configuration procedure.

The configuration related to the relay terminal exclusion is merely an example for convenience of description, and exemplary embodiments of the present disclosure are not limited thereto. For example, in another exemplary embodiment of the communication system 700, the maximum number of relay terminals that can be operated in each relay terminal selection area may be set. In this case, even when a certain terminal is included in the relay terminal selection area, if the number of terminals previously configured as relay terminals exceeds the maximum number of relay terminals, the terminal may be excluded from the relay terminal. For example, the first base station 710 may transmit information related to the number of terminals already configured as relay terminals in the current relay terminal selection area or the number of relay terminals additionally configurable in the current relay terminal selection area to terminals within cell coverage.

For example, a fifth terminal (not shown) included in the second relay terminal selection area 718 may identify whether a relay terminal can be additionally configured in the current second relay terminal selection area 718 based on the information transmitted from the first base station 710. When it is identified that additional configuration of the relay terminal is possible in the second relay terminal selection area 718, the fifth terminal may perform a relay terminal configuration procedure.

On the other hand, a sixth terminal (not shown) included in the first relay terminal selection area 714 may identify whether a relay terminal can be additionally configured in the current first relay terminal selection area 714 based on the information transmitted from the first base station 710. If the number of relay terminals configurable in the first relay terminal selection area 714 is one, it may not be possible to configure additional relay terminals due to the first terminal 720 already configured as the relay terminal. In this case, the sixth terminal may determine that it corresponds to a relay terminal exclusion target.

Figure 8:
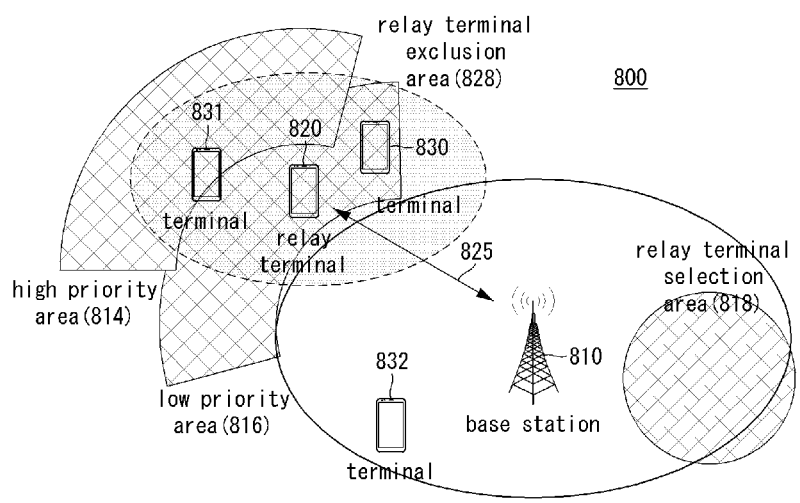
FIG. 8 is a conceptual diagram illustrating a fourth exemplary embodiment of a method for selecting a relay terminal using a sidelink in a wireless communication system.

FIG. 8 is a conceptual diagram illustrating a fourth exemplary embodiment of a method for selecting a relay terminal using a sidelink in a wireless communication system.

Referring to FIG. 8, a communication system 800 may include one or more base stations and one or more terminals. In FIG. 8, a communication system including one base station and a plurality of terminals is shown as an example. However, this is only an example for convenience of description, and exemplary embodiments of the present disclosure are not limited thereto.

In an exemplary embodiment, the communication system 800 may include a first base station 810 and a plurality of terminals 820, 830, 831, and 832. The first base station 710 may be configured identically or similarly to the first base station 510 described with reference to FIG. 5. Each of the plurality of terminals 820, 830, 831, and 832 may be configured identically or similarly to the terminals 520, 530, 531, and 532 described with reference to FIG. 5. Each of the plurality of terminals 820, 830, 831, and 832 may be referred to as the first terminal 820, the second terminal 830, the third terminal 831, the fourth terminal 832, and the like. Hereinafter, in describing a fourth exemplary embodiment of a method for selecting a relay terminal using a sidelink in a wireless communication system with reference to FIG. 8, contents overlapping with those described with reference to FIGS. 5 to 7 will be omitted.

In an exemplary embodiment of the communication system 800, the first base station 810 may configure one or more relay terminal selection areas 814, 816, and 818. The one or more relay terminal selection areas 814, 816, and 819 may be configured so that terminals located in a specific location or a specific space within a cell coverage of the first base station 810 are configured as relay terminals. The one or more relay terminal selection areas 814, 816, and 818 may be referred to as the first relay terminal selection areas 814 and 816 and the second relay terminal selection area 818, respectively. The first relay terminal selection areas 814 and 816 may be classified into the high priority area 814 and the low priority area 816 based on a distance from the first base station 810 and/or a communication environment situation.

The first base station 810 may transmit information on the configured first and second relay terminal selection areas 814, 816, and 818 to the terminals 820, 830, 831, and 832 within the cell coverage. Each of the terminals 820, 830, 831, and 832 receiving the information on the first and second relay terminal selection areas 814, 816, and 818 may identify whether its location is included in the relay terminal selection areas by comparing its location information with the information on the first and second relay terminal selection areas 814, 816, and 818. The fourth terminal 832 may identify that its location is not included in any of the first and second relay terminal selection areas 814, 816, and 818.

On the other hand, the first terminal 820 may identify that its location is included in the lower priority area 816 of the first relay terminal selection areas 814 and 816. When an adjacent relay terminal is not detected at the corresponding time point, the first terminal 820 may be configured as a relay terminal by performing a relay terminal configuration procedure. A connection 825 between the first terminal 820 configured as the relay terminal and the first base station 810 may be configured through a Uu interface, and a connection between the first terminal 820 and another terminal requiring relaying may be configured through a PC5 interface for sidelink.

The second terminal 830 may identify that its location is included in the low priority area 816 of the first relay terminal selection areas 814 and 816. The second terminal 830 may receive a relay terminal exclusion message transmitted from the first terminal 820 already configured as the relay terminal. Based on the relay terminal exclusion message received from the first terminal 820, the second terminal 830 may identify that itself is included in a relay terminal exclusion area 828 due to the first terminal 820, and that itself is included in the same low priority area 816 as the first terminal 820. In this case, the second terminal 830 may determine that itself corresponds to a relay terminal exclusion target and may not perform a relay terminal configuration procedure.

On the other hand, the third terminal 831 may identify that its location is included in the high priority area 814 among the first relay terminal selection areas 814 and 816. The third terminal 831 may receive the relay terminal exclusion message transmitted from the first terminal 820 already configured as the relay terminal. Based on the relay terminal exclusion message received from the first terminal 820, the third terminal 831 may identify that itself is included in the relay terminal exclusion area 828 due to the first terminal 820, and that itself is included in the high priority area 814 having the higher priority that the low priority area 816 in which the first terminal 820 is located. In this case, the third terminal 831 may determine that itself corresponds to a relay terminal replacement target and perform a relay terminal replacement procedure. Through this, the first terminal 820 may be released from the relay terminal and the third terminal 820 may be configured as a relay terminal.

Figure 9:
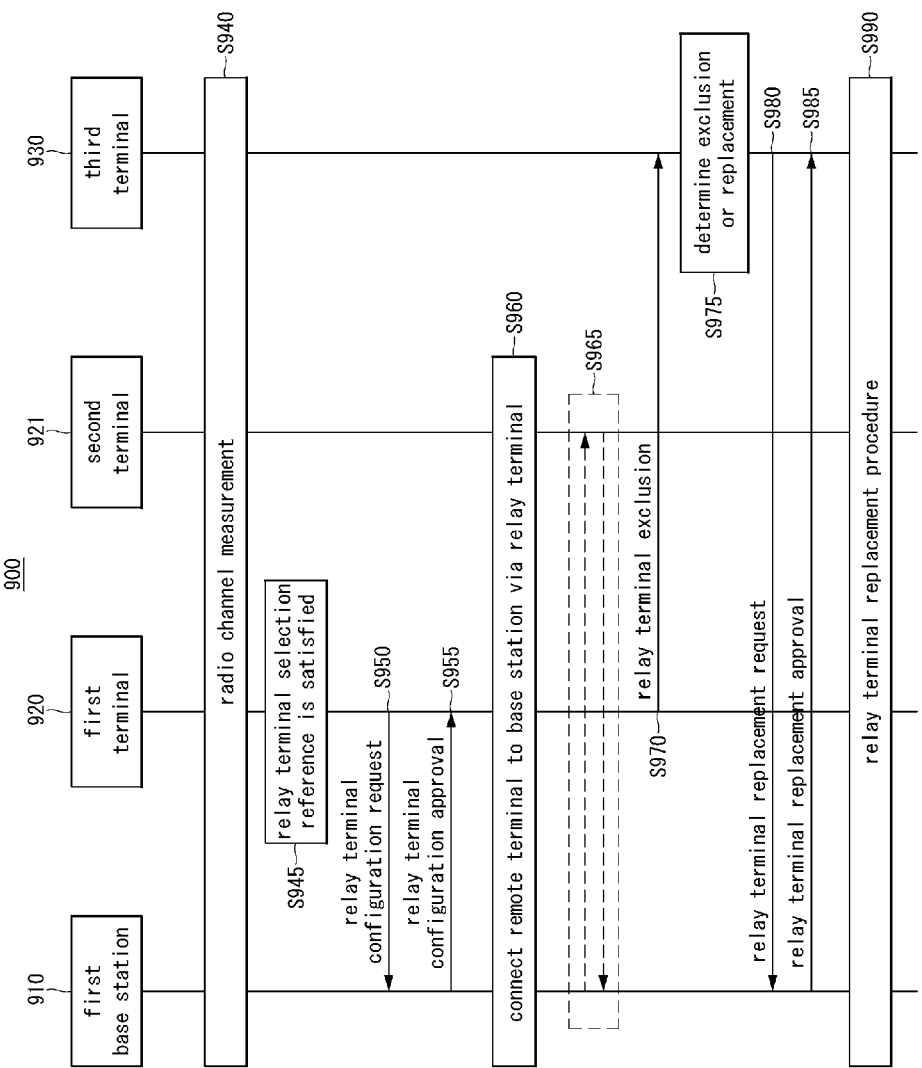
FIG. 9 is a conceptual diagram describing a second exemplary embodiment of a relaying method using a sidelink in a mobile communication system.

FIG. 9 is a conceptual diagram describing a second exemplary embodiment of a relaying method using a sidelink in a mobile communication system.

Referring to FIG. 9, a communication system 900 may include one or more base stations and one or more terminals. In FIG. 9, a communication system including one base station and a plurality of terminals is shown as an example. However, this is only an example for convenience of description, and exemplary embodiments of the present disclosure are not limited thereto.

In an exemplary embodiment, the communication system 900 may include a first base station 910 and a plurality of terminals 920, 921, and 930. The first base station 910 may be configured identically or similarly to the first base stations 510, 610, 710, and 810 described with reference to FIGS. 5 to 8. Each of the plurality of terminals 920, 921, and 930 may be configured identically or similarly to the terminals described with reference to FIGS. 5 to 8. Each of the plurality of terminals 920, 921, and 930 may be referred to as the first terminal 920, the second terminal 921, and the third terminal 930, and the like. Hereinafter, in describing a second exemplary embodiment of a relaying method using a sidelink in a wireless communication system with reference to FIG. 9, contents overlapping with those described with reference to FIGS. 5 to 8 will be omitted.

In an exemplary embodiment of the communication system 900, each of the first to third terminals 920, 921, and 930 may measure a radio channel state between the first base station 910 and itself (S940). The first to third terminals 920, 921, and 930 may obtain measured values for radio signals received from the base station. Each of the first to third terminals 920, 921, and 930 may determine whether itself satisfies a predetermined relay terminal selection reference (s) as a relay terminal relaying communication between the first base station 910 and another terminal based on the obtained measured value. In other words, each of the first to third terminals 920, 921, and 930 may determine whether itself is within a predetermined relay terminal selection area based on the obtained measured value. For example, these operations may be the same as or similar to those described with reference to FIGS. 5 and 6.

On the other hand, in another exemplary embodiment of the communication system 900, the first to third terminals 920, 921, and 930 may obtain information of preconfigured relay terminal selection area(s) from the first base station 910 based on their location information. The first to third terminals may obtain information related to their absolute or relative location through a GPS or the first base station 910. Each of the first to third terminals 920, 921, and 930 may identify whether its own location is included in a relay terminal selection area based on the obtained location information and the information on relay terminal selection area(s). When each of the first to third terminals 920, 921, and 930 identifies that its location is included in a relay terminal selection region, it may determine that itself satisfies the relay terminal selection reference(s) for relay terminal selection. For example, these operations may be the same as or similar to those described with reference to FIGS. 7 and 8.

When it is determined that the first terminal 920 satisfies the relay terminal selection reference(s) (S945), the first terminal 920 may perform a relay terminal configuration procedure. In other words, when it is determined that the first terminal 920 is within a predetermined relay terminal selection area (S945), the first terminal 920 may perform a relay terminal configuration procedure. For example, the first terminal 920 may transmit a message requesting relay terminal configuration to the first base station 910 to perform the relay terminal configuration procedure. The first base station 910 may or may not approve the relay terminal configuration with respect to the first terminal 920 that has requested the relay terminal configuration. When the first base station 910 transmits a message to approve the relay terminal configuration as a response to the relay terminal configuration request message of the first terminal 920 (S955), the first terminal 920 may be configured as a relay terminal capable of performing a relay role between the first base station 910 and another terminal. The first terminal 920 may be configured to relay communication between the first base station 910 and another terminal. As a relay terminal, the first terminal 920 may transmit a message indicating that itself is a relay terminal in a broadcast manner in order to be connected to another terminal (i.e., remote terminal).

On the other hand, the second terminal 921 may determine that itself does not satisfy the relay terminal selection area based on the result of radio channel measurement and/or the information related to the location of the second terminal 921. In this case, the second terminal 921 may not be configured as a relay terminal. Meanwhile, the second terminal 921 may determine whether direct communication with the first base station 910 is easy or not based on the result of the radio channel measurement and the like. If it is determined that direct communication between the second terminal 921 and the first base station 910 is not easy, the second terminal 921 may discover a relay terminal to relay communication with the first base station 910. For example, the second terminal 921 may identify the existence of the first terminal 920 configured as the relay terminal by the first base station 910 based on the broadcast message from the first terminal 920. Based on the broadcast message from the first terminal 920, the second terminal 921 may identify information such as a radio channel state between the first terminal 920 and the second terminal 921, and/or a distance between the first terminal 920 and the second terminal 921. The second terminal 921 may determine whether the first terminal 920 is suitable for relaying communication between itself and the first base station 910 based on the identified radio channel state or distance. When it is determined that the first terminal 920 is suitable for relaying communication between the second terminal 921 and the first base station 910, the second terminal 921 may transmit a message requesting the first terminal 920 to relay the communication between itself and the base station. Accordingly, a connection between the first base station 910 and the first terminal 920 and a connection between the first terminal 920 and the second terminal 921 may be configured (S960). Here, the connection between the first terminal 920 and the first base station 910 for relaying may be configured through a Uu interface. On the other hand, the connection between the first terminal 920 and the second terminal 921 for relaying may be configured through a PC5 interface as a sidelink connection. Accordingly, the first terminal 920 may relay the communication between the first base station 910 and the second terminal 921 so that the first base station 910 and the second terminal 921 can communicate with each other. Configurations of the connection structures between the first base station 910, the first terminal 920, and the second terminal 921 will be described in more detail below with reference to FIGS. 10A to 10B.

In an exemplary embodiment of the communication system 900, after being configured as the relay terminal, the first terminal 920 may transmit the same or similar relay terminal exclusion message as described with reference to FIGS. 5 to 8 in a broadcast manner (S970. Here, the relay terminal exclusion message may include information indicating that the first terminal 920 is already configured as the relay terminal. The third terminal 930 may receive the relay terminal exclusion message transmitted from the first terminal 920 (S970). Based on the received relay terminal exclusion message, the third terminal 930 may determine whether itself corresponds to a relay terminal exclusion target.

Specifically, the third terminal 930 may identify that itself is within a predetermined relay terminal selection area based on the step S940 or the like. Accordingly, the third terminal 930 may perform a relay terminal configuration procedure. Alternatively, before performing a relay terminal configuration procedure, the third terminal 930 may identify whether another terminal already configured as a relay terminal exists. The third terminal 930 may receive the relay terminal exclusion message transmitted from the first terminal 920 (S970). Based on a measurement result on the received relay terminal exclusion message and a predetermined relay terminal exclusion reference value, the third terminal 930 may determine whether itself corresponds to a relay terminal exclusion target. For example, these operations may be the same as or similar to those described with reference to FIGS. 5 to 8.

Meanwhile, the third terminal 930 may compare a priority configured to the relay terminal selection area or sub-area in which itself is located with a priority configured to the relay terminal selection area or sub-area in which the first terminal 920 is located. Based on such the priority comparison, the third terminal 930 may determine whether itself corresponds to a relay terminal exclusion target or a relay terminal replacement target (S975). These operations may be the same as or similar to those described with reference to FIGS. 6 and 8.

When it is determined that the third terminal 930 corresponds to a relay terminal replacement target, the third terminal 930 may transmit a message requesting relay terminal replacement to the first base station 910. When a message approving the relay terminal replacement is received from the first base station 910, the first base station 910, the first terminal 920, the second terminal 921, and the third terminal 930 may perform a relay terminal replacement procedure (S990). In the relay terminal replacement procedure, the first base station 910 and/or the first terminal 920 may operate such that the first terminal 920 is released from the relay terminal. The first base station 910 and/or the third terminal 930 may operate so that the third terminal 930 is configured as a relay terminal. The sidelink connection between the first terminal 920 and the second terminal 921 may be released, and a sidelink connection between the third terminal 930 and the second terminal 921 may be newly configured. Accordingly, the second terminal 921 may communicate with the first base station 910 through relaying of the third terminal 930.

FIGS. 10A to 10H are exemplary diagrams for describing exemplary embodiments of a user plane or control plane protocol structure for supporting a relay function in a wireless communication system.

Referring to FIGS. 10A to 10H, a communication system 1000 may include a remote terminal 1010, a relay terminal 1030, a base station 1050, and a core network (CN) 1070. Here, the core network 1070 may be the same as or similar to the core network described with reference to FIG. 1 or the core network 380 described with reference to FIG. 3. The core network 1070 may correspond to a 5G core network. The base station 1050 may be configured identically or similarly to the first base stations 510, 610, 710, and 810 described with reference to FIGS. 5 to 9. The base station 1050 may correspond to a gNodeB (gNB). The remote terminal 1010 may correspond to the second terminal 921 described with reference to FIG. 9. The relay terminal may be configured identically or similarly to the first terminal 920 or the third terminal 930 that relays communication between the first base station 910 and the second terminal 921 described with reference to FIG. 9. The relay terminal 1030 may relay communication between the remote terminal 1010 and the base station 1050. The remote terminal 1010 may be connected to the base station 1050 and the core network 1070 through the relay terminal 1030. The relay terminal 1030 may be referred to as a 'UE-to-Network (U2N)' relay terminal.

The relay terminal 1030 may map links of the respective interfaces through the relay function, and route data according to the structure of mapped links. Depending on a protocol to which the relay function is applied, links identified in the protocol may be applied. The link used here may be configured based on an Internet protocol (IP) address, QoS Flow, radio bearer (RB), RLC channel, logical channel, transport channel, and the like. The operation of mapping the links may also be referred to as an operation of associating the links. In the operation of mapping the links, a destination of a signal or data may be identified by identifying a link mapped with a link of the received signal or data. Such the operation may be referred to as routing for signals or routing for data.

The relay terminal may configure sidelink(s) with one or more remote terminals. In a sidelink, one or more connections may be configured according to the type of traffic for each remote terminal. One connection may be configured or a plurality of connections may be configured between one relay terminal and one remote terminal.

In FIGS. 10A to 10H show a connection relationship between one remote terminal 1010, one relay terminal 1030, and one base station 1050. However, this is only an example for convenience of description, and exemplary embodiments of the present disclosure are not limited thereto. For example, in another exemplary embodiment of the communication system 1000, one relay terminal may configure sidelink connection(s) with a plurality of remote terminals. Alternatively, one relay terminal may configure a plurality of connections with one remote terminal based on a plurality of mutually distinguished radio bearers.

Figure 10A:
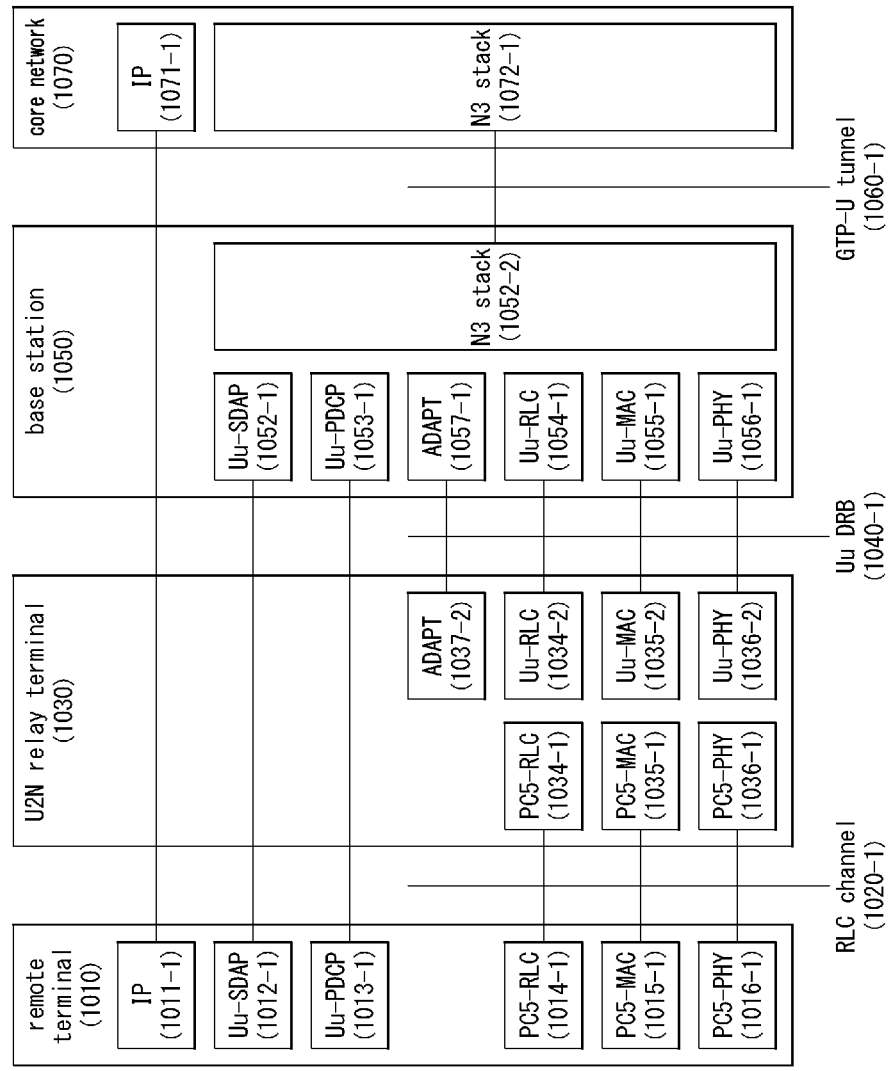
Figure 10B:
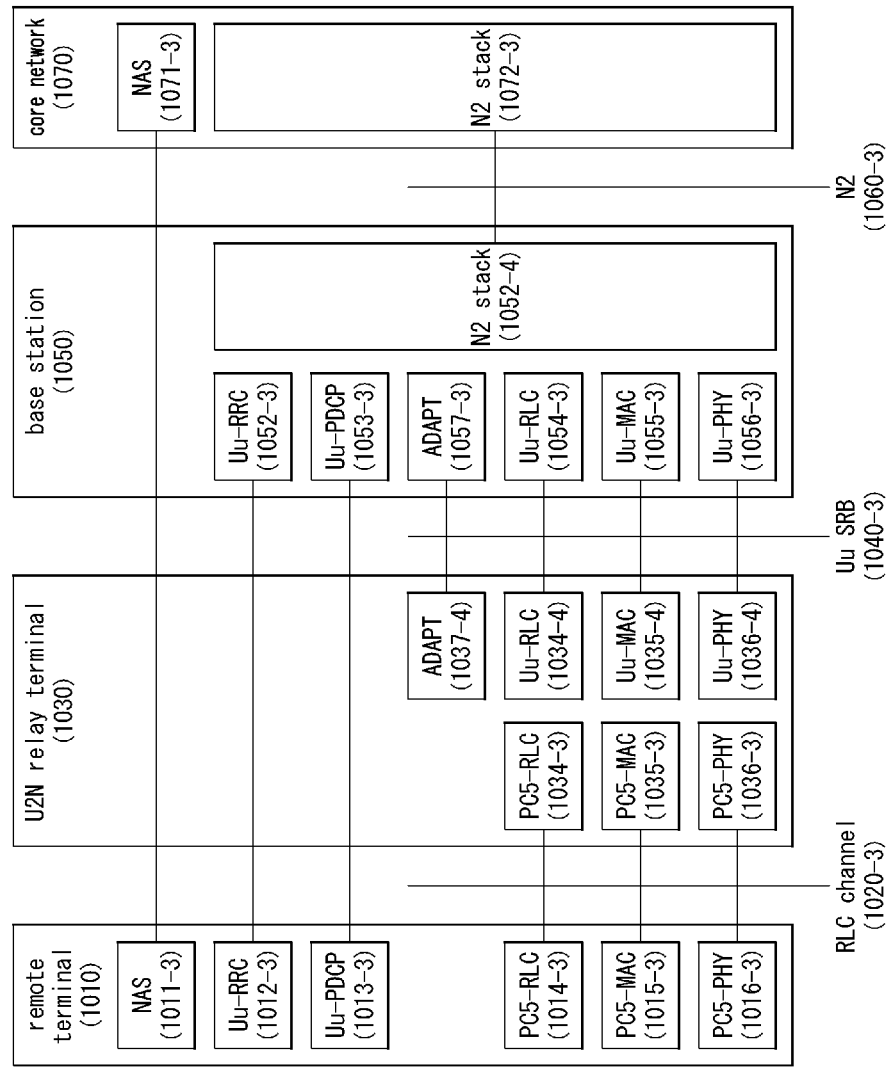
Figure 10D:
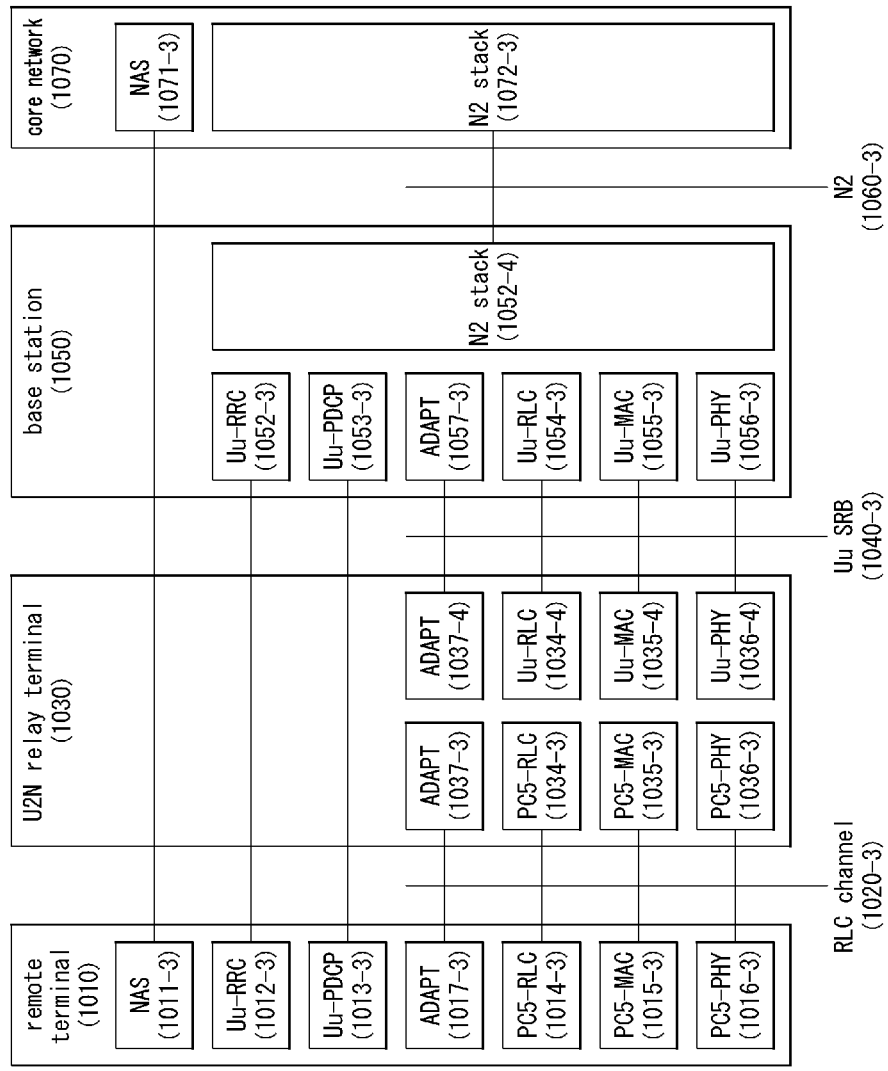

FIGS. 10A and 10B show a first exemplary embodiment of a user plane protocol structure and a control plane protocol structure for supporting a relay function in a wireless communication system. FIGS. 10C and 10D show a second exemplary embodiment of a user plane protocol structure and a control plane protocol structure for supporting a relay function in a wireless communication system. FIGS. 10E to 10H show third to sixth exemplary embodiments of a user plane protocol structure for supporting a relay function in a wireless communication system.

Referring to FIG. 10A, in the user plane protocol structure for supporting the relay function in the communication system 1000, the core network 1070 may transmit and receive user data with the remote terminal 1010 through the base station 1050 and the relay terminal 1030 based on a preconfigured protocol structure or protocol stack. In the communication system 1000 supporting 5G communication, the user plane protocol structure may include a non-access stratum (NAS) protocol and an access stratum (AS) protocol. The NAS protocol is a protocol for signal transmission between the terminal and the core network, and may be configured to include an IP layer and the like. The AS protocol may be a protocol for signal transmission between the terminal and the base station, and may include a service data adaptation protocol (SDAP) layer, a packet data convergence protocol (PDCP) layer, a radio link control (RLC) layer, a media access control (MAC) layer, a physical (PHY) layer, and the like. In the IP layer, application data from an upper layer may be delivered to a lower layer in form of data packets or IP packets. In the SDAP layer, classification of quality-of-(QoS) flows may be performed based on header information of IP packets or Ethernet frames received from the upper layer, and the QoS flows may be mapped to data radio bearers (DRBs). More specifically, the SDAP layer may perform or provide functions related to mapping between the QoS flows and the data radio bearers, marking of QoS flows, ID (i.e., QFI), etc. on downlink packets and uplink packets, and the like. The PDCP layer may sequentially deliver user data and may perform header compression and encryption functions. The RLC layer may operate in one operation mode among a transport mode (TM), an unacknowledged mode (UM), and an acknowledged mode (AM) to ensure various QoS required by a plurality of radio bearers. In addition, the RLC layer may correct errors through an automatic repeat request (ARQ) function.

The MAC layer may map logical channels to physical channels. The MAC layer may generate a transport block by multiplexing MAC service data units (MAC SDUs). The MAC layer may deliver the transport block through the PHY layer, and may obtain the MAC SDUs by demultiplexing the transport block received through the PHY layer. In addition, the MAC layer may correct errors through a hybrid automatic repeat request (HARQ) function.

The PHY layer may exchange data with the upper layer of the AS protocol by using physical channels. The physical channels may exchange data with the upper layer of the AS protocol by using a data modulation scheme such as orthogonal frequency division multiplexing (OFDM). The PHY layers may utilize radio resources and may specifically utilize time resources and frequency resources. The PHY layer may be connected to the MAC layer through transport channels.

When the connection between the remote terminal 1010 and the base station 1050 is configured through relaying of the relay terminal 1030, in the first exemplary embodiment of the user plane protocol structure for supporting the relay function, an IP layer 1011-1 of the remoted terminal 1010 may be connected to an IP layer 1071-1 of the core network 1070.

In the SDAP layer and the PDCP layer, the remote terminal 1010 may be connected to the base station 1050 through a Uu interface. In other words, the SDAP layer and the PDCP layer may be terminated at the link between the remote terminal 1010 and the base station 1050. A Uu-SDAP layer 1012-1 of the remote terminal 1010 may be connected to a Uu-SDAP layer 1052-1 of the base station. A Uu-PDCP layer 1013-1 of the remote terminal 1010 may be connected to a Uu-PDCP layer 1053-1 of the base station.

In the first exemplary embodiment of the user plane protocol structure shown in FIG. 10A, the PDCP layers and the SDAP layers may be located in the remote terminal 1010 and the base station 1050, and may operate as peer-to-peer protocols between them. A retransmission function may be performed for each interface, and data order assurance and security functions may be performed between ends of the remote terminal 1010 and the base station 1050. In particular, key distribution required for the security function performed in the PDCP layer may be provided through the relay terminal 1030.

On the other hand, in the RLC layer, the MAC layer, and the PHY layer, the remote terminal 1010 may be connected to the relay terminal 1030 through a PC5 interface for sidelink, and the relay terminal 1030 may be connected to the base station 1050 through a Uu interface. In other words, the RLC layer, the MAC layer, and the PHY layer may be terminated at the link between the remote terminal 1010 and the relay terminal 1030, and at the link between the relay terminal 1030 and the base station 1050. A PC5-RLC layer 1014-1 of the remote terminal 1010 may be connected to a PC5-RLC layer 1034-1 of the relay terminal 1030. A PC5-MAC layer 1015-1 of the remote terminal 1010 may be connected to a PC5-MAC layer 1035-1 of the relay terminal 1030. A PC5-PHY layer 1016-1 of the remote terminal 1010 may be connected to a PC5-PHY layer 1036-1 of the relay terminal 1030. A Uu-RLC layer 1034-2 of the relay terminal 1030 may be connected to a Uu-RLC layer 1054-1 of the base station 1050. A Uu-MAC layer 1035-2 of the relay terminal 1030 may be connected to a Uu-MAC layer 1055-1 of the base station 1050. A Uu-PHY layer 1036-2 of the relay terminal 1030 may be connected to a Uu-PHY layer 1056-1 of the base station 1050. An N3 stack 1052-2 of the base station 1050 may be connected to an N3 stack 1072-1 of the core network 1070. The base station 1050 may be connected to a UPF, which is a user plane function of the core network 1070, through an N3 interface. Data may be transmitted/received between the remote terminal 1010 and the relay terminal 1030 based on an RLC channel 1020-1. Data may be transmitted/received between the relay terminal 1030 and the base station 1050 based on a Uu-DRB 1040-1. Data may be transmitted/received between the base station 1050 and the core network 1070 based on a general packet radio service (GPRS) tunneling protocol (GTP)-U tunnel 1060-1 based on a GTP.

A Uu-SDAP layer 1052-1 and a Uu-PDCP layer 1053-1 of the base station 1050 may be configured for each of connected one or more remote terminals 1010 and one or more relay terminals 1030. In other words, the number of Uu-SDAP layers 1052-1 and Uu-PDCP layers 1053-1 of the base station 1050 may be the same as the number of connected terminals 1010 and 1030. Meanwhile, the Uu-RLC layer 1054-1, the Uu-MAC layer 1055-1, and the Uu-PHY layer 1056-1 of the base station 1050 may be configured for each of one or more connected relay terminals 1030. In other words, the number of Uu-RLC layers 1054-1, Uu-MAC layers 1055-1, and Uu-PHY layers 1056-1 of the base station 1050 may be the same as the number of connected relay terminals 1030. The PC5-RLC layer 1034-1, the PC5-MAC layer 1035-1, and the PC5-PHY layer 1036-1 of the relay terminal 1030 may be configured for each of the connected one or more remote terminals 1010. In other words, the number of PC5-RLC layers 1034-1, PC5-MAC layers 1035-1, and PC5-PHY layers 1036-1 of the relay terminals 1030 may be the same as the number of connected one or more remote terminals 1010.

An adaptation layer may be further defined in the user plane protocol structure of the communication system 1000. In an exemplary embodiment, the adaptation layer may be a layer higher than the RLC layer. The adaptation layer may be used to effectively configure connection(s) or routing for multiplexing between the base station 1050 and one or more remote terminals 1010. The adaptation layer may perform an RLC channel mapping function between the base station 1050 and the relay terminal 1030.

In the first exemplary embodiment of the user plane protocol structure shown in FIG. 10A, the adaptation layer may be supported in the Uu interface between the base station 1050 and the relay terminal 1030, and may not be supported in the PC5 interface between the remote terminal 1010 and the relay terminal 1030. The adaptation layer may be configured above the RLC layer of the Uu interface (i.e., Uu-RLC layers 1034-2 and 1054-1) in the relay terminal 1030 and the base station 1050. The adaptation layer 1037-2 of the relay terminal 1030 may be connected to the adaptation layer 1057-1 of the base station 1050. The adaptation layer 1037-2 of the relay terminal 1030 and the adaptation layer 1057-1 of the base station 1050 may obtain multiplexing identification information for mapping or routing of each data unit with respect to each data unit delivered from the lower layers, the Uu-RLC layer 1034-2 of the relay terminal 1030 and the Uu-RLC layer 1054-1 of the base station 1050, respectively. Here, the multiplexing identification information may be identification information defined or configured by an entity supporting the function of the Uu-RRC layer 1052-3 on the control plane protocol structure of the base station 1050 whenever each remote terminal 1010 is connected to the base station 1050 through the relay terminal 1030. The multiplexing identification information may refer to identification information for mapping or routing for each remote terminal 1010 or for each radio bearer. Each multiplexing identification information may be delivered from the base station 1050 to the relay terminal 1030. Each multiplexing identification information may be stored in the adaptation layer 1037-2 of the relay terminal 1030 and the adaptation layer 1057-1 of the base station 1050, and may be added to a data unit delivered from the remote terminal 1010 or the core network 1070 for identification of the data unit. The adaptation layer 1037-2 of the relay terminal 1030 and the adaptation layer 1057-1 of the base station 1050 may identify or obtain the multiplexing identification information unique to each data unit from the data unit delivered from the PC5-RLC layer 1034-1 of the relay terminal 1030 and the Uu-PDCP layer 1053-1 of the base station 1050, respectively. The adaptation layer 1037-2 of the relay terminal 1030 and the adaptation layer 1057-1 of the base station 1050 may add the multiplexing identification information for mapping or routing to the data unit delivered from the PC5-RLC layer 1034-1 of the relay terminal 1030 and the Uu-PDCP layer 1053-1 of the base station 1050, respectively.

For example, a plurality of first entities supporting functions of the PC5-RLC layer 1034-1 of the relay terminal 1030 may deliver a plurality of data units to be transmitted to the base station 1050 of the relay terminal 1030 to a second entity performing functions of the adaptation layer 1037-2 of the relay terminal 1030. The second entity performing functions of the adaptation layer 1037-2 of the relay terminal 1030 may generate a multiplexed uplink (UL) data unit by multiplexing the plurality of data units. A header of the multiplexed UL data unit generated by the second entity may include multiplexing identification information corresponding to each of the plurality of remote terminals 1010 having transmitted the plurality of data units to be transmitted to the base station 1050. The multiplexed UL data unit may be transmitted to the base station 1050. A third entity supporting functions of the Uu-RLC layer 1054-1 of the base station 1050 may deliver the multiplexed UL data unit received from the relay terminal 1030 to a fourth entity performing functions of the adaptation layer 1057-1 of the base station 1050. Based on the multiplexing identification information included in the header of the multiplexed UL data unit received from the relay terminal 1030, the fourth entity performing function of the adaptation layer 1057-1 of the base station 1050 may identify or obtain the plurality of data units transmitted from the plurality of remote terminals 1010. The base station 1050 may transmit the plurality of data units identified or obtained by the fourth entity performing functions of the adaptation layer 1057-1 to the core network 1070.

On the other hand, the fourth entity performing functions of the adaptation layer 1057-1 of the base station 1050 may receive, from the plurality of third entities supporting functions of the Uu-PDCP layer 1054-1 of the base station 1050, the plurality of data units to be transmitted to the plurality of remote terminals 1010 respectively corresponding thereto. The fourth entity may multiplex the plurality of data units to generate a multiplexed DL data unit. A header of the multiplexed DL data unit generated by the fourth entity may include multiplexing identification information corresponding to each of the plurality of remote terminals 1010 to which the multiplexed plurality of data units are to be transmitted. The multiplexed DL data unit may be transmitted to the relay terminal 1030. The first entity supporting functions of the Uu-RLC layer 1034-2 of the relay terminal 1030 may deliver the multiplexed DL data unit received from the base station 1050 to the second entity performing functions of the adaptation layer 1037-2 of the relay terminal 1030. The second entity may identify or obtain the plurality of data units to be respectively transmitted to the plurality of remote terminals 1010 based on the multiplexing identification information included in the header of the multiplexed DL data unit received from the base station 1050. The relay terminal 1030 may transmit each of the plurality of data units identified or obtained by the second entity to the corresponding remote terminal 1010. The transmission procedure according to the multiplexing function of the adaptation layer will be described in more detail with reference to FIG. 11B.

Referring to FIG. 10B, in the first exemplary embodiment of the control plane protocol structure for supporting the relay function in the communication system 1000, the core network 1070 may transmit and receive a control signal to and from the remote terminal 1010 through the base station 1050 and the relay terminal 1030 based on the preconfigured protocol structure or protocol stack. Hereinafter, in describing the first exemplary embodiment of the control plane protocol structure for supporting the relay function in the wireless communication system with reference to FIG. 10B, content overlapping with that described with reference to FIG. 10A will be omitted.

The control plane structure may include a NAS layer, a radio resource control (RRC) layer, a PDCP layer, an RLC layer, a MAC layer, a PHY layer, and the like. The RRC layer may perform a configuration function, reconfiguration function, and release function on radio bearer(s). The RRC layer may perform control functions on logical channels, transport channels, and physical channels.

In the first exemplary embodiment of the control plane protocol structure for supporting the relay function, the NAS layer 1011-3 of the remote terminal 1010 may be connected with the NAS layer 1071-3 of the core network 1070. In the RRC layer and the PDCP layer, the remote terminal 1010 may be connected to the base station 1050 through a Uu interface. In other words, the RRC layer and the PDCP layer may be terminated at the link between the remote terminal 1010 and the base station 1050. The Uu-RRC layer 1012-3 of the remote terminal 1010 may be connected to the Uu-RRC layer 1052-3 of the base station. The Uu-PDCP layer 1013-3 of the remote terminal 1010 may be connected to the Uu-PDCP layer 1053-3 of the base station. The PDCP layers and the RRC layers may be located in the remote terminal 1010 and the base station 1050 and may operate as peer-to-peer protocols between them. In particular, key distribution required for security functions performed in the PDCP layer may be provided via the relay terminal.

On the other hand, in the RLC layer, the MAC layer, and the PHY layer, the remote terminal 1010 may be connected to the relay terminal 1030 through a PC5 interface for sidelink, and the relay terminal 1030 may be connected to the base station 1050 through a Uu interface. In other words, the RLC layer, MAC layer, and PHY layer may be terminated at the link between the remote terminal 1010 and the relay terminal 1030, and at the link between the relay terminal 1030 and the base station 1050. The PC5-RLC layer 1014-3 of the remote terminal 1010 may be connected to the PC5-RLC layer 1034-3 of the relay terminal 1030. The PC5-MAC layer 1015-3 of the remote terminal 1010 may be connected to the PC5-MAC layer 1035-3 of the relay terminal 1030. The PC5-PHY layer 1016-3 of the remote terminal 1010 may be connected with the PC5-PHY layer 1036-3 of the relay terminal 1030. The Uu-RLC layer 1034-4 of the relay terminal 1030 may be connected with the Uu-RLC layer 1054-3 of the base station 1050. The Uu-MAC layer 1035-4 of the relay terminal 1030 may be connected with the Uu-MAC layer 1055-3 of the base station 1050. The Uu-PHY layer 1036-4 of the relay terminal 1030 may be connected to the Uu-PHY layer 1056-3 of the base station 1050. An N2 stack 1052-4 of the base station 1050 may be connected to an N2 stack 1072-3 of the core network 1070. The base station 1050 may be connected to an AMF, which is a control plane function of the core network 1070, through an N2 interface. A control signal may be transmitted and received between the remote terminal 1010 and the relay terminal 1030 based on an RLC channel 1020-3. A control signal may be transmitted and received between the relay terminal 1030 and the base station 1050 based on a Uu signaling RB (Uu-SRB) 1040-3. A control signal may be transmitted and received between the base station 1050 and the core network 1070 based on the N2 interface 1060-3.

Referring to FIGS. 10C and 10D, in the second exemplary embodiment of the user plane protocol structure and the control plane protocol structure for supporting the relay function in the communication system 1000, the core network 1070 may transmit and receive a control signal to and from the remote terminal 1010 through the base station 1050 and the relay terminal 1030 based on the preconfigured protocol structure or protocol stack. Hereinafter, in describing the second exemplary embodiment of the user plane and control plane protocol structure for supporting the relay function in the wireless communication system with reference to FIGS. 10C and 10D, contents overlapping with those described with reference to FIGS. 10A and 10B will be omitted.

In the second exemplary embodiment of the user plane protocol structure and the control plane protocol structure shown in FIGS. 10C and 10D, the adaptation layer may be supported in the Uu interface between the base station 1050 and the relay terminal 1030 and the PC5 interface between the remote terminal 1010 and the relay terminal 1030. The adaptation layer may be configured above the RLC layer (i.e., Uu-RLC layers 1034-2, 1054-1, 1034-4, and 1054-3) of the Uu interface in the relay terminal 1030 and the base station 1050, and may be configured above the RLC layer (i.e., PC5-RLC layers 1014-1, 1034-1, 1014-3, and 1034-4) of the PC5 interface in the remote terminal 1010 and the relay terminal 1030. In the relay terminal 1030, the adaptation layers 1037-2 and 1037-4 of the Uu interface may be connected to the adaptation layers 1057-1 and 1057-3 of the base station 1050. Meanwhile, in the relay terminal 1030, the adaptation layers 1037-1 and 1037-3 of the PC5 interface may be connected to the adaptation layers 1017-1 and 1017-3 of the remote UE 1010.

The mapping or routing scheme according to the first and second exemplary embodiments of the user plane protocol structure and the control plane protocol structure for supporting the relay function in the wireless communication system shown in FIGS. 10A to 10D will be referred to as an 'RLC channel routing' scheme. However, this is only an example for convenience of description, and exemplary embodiments of the present disclosure are not limited thereto. For example, in another exemplary embodiment of the communication system 1000, relaying according to various mapping or routing schemes, such as a 'QoS flow routing' scheme, an 'RB routing' scheme, a 'logical channel routing' scheme, or a 'transport channel routing' scheme, may be performed. Hereinafter, in describing the third to sixth exemplary embodiments of the user plane protocol structure for supporting the relay function in the wireless communication system with reference to FIGS. 10E and 10F, contents overlapping with those described with reference to FIGS. 10A to 10D will be omitted.

Figure 10E:
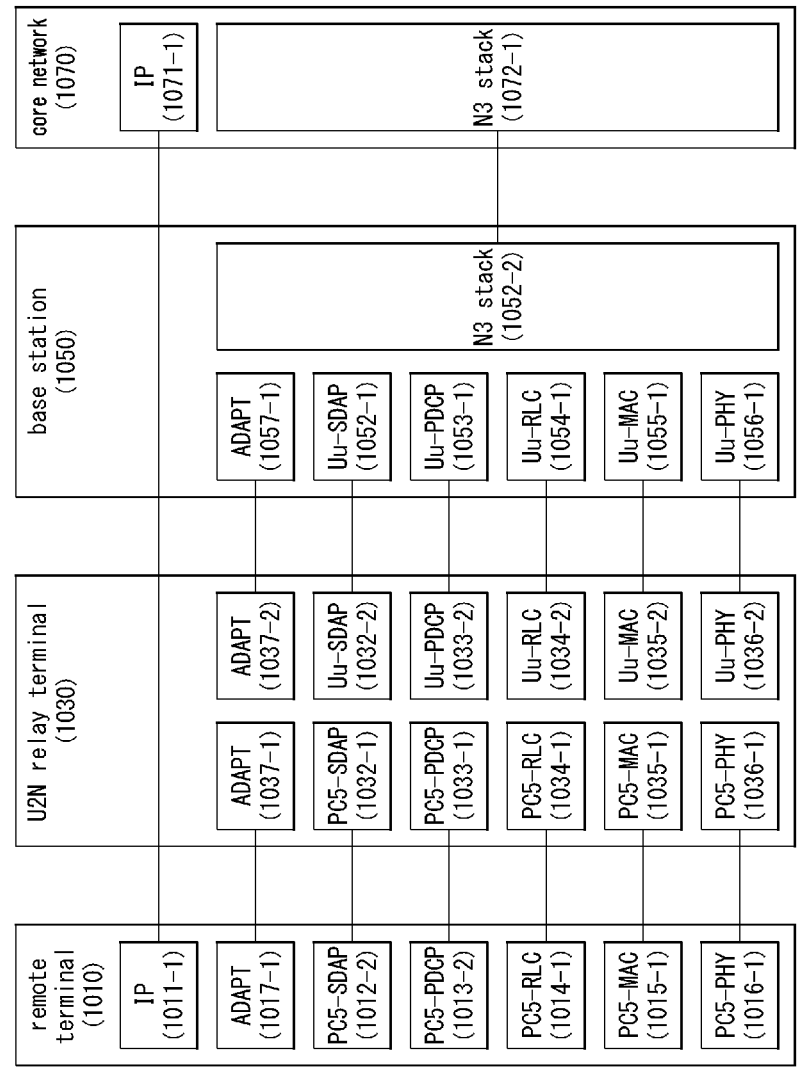

Referring to FIG. 10E, the third exemplary embodiment of the user plane protocol structure for supporting the relay function may support the relay function according to the QoS flow routing scheme. In the communication system 1000, the core network 1070 may transmit and receive user data to and from the remote terminal 1010 through the base station 1050 and the relay terminal 1030 based on the preconfigured protocol structure or protocol stack. When the connection between the remote terminal 1010 and the base station 1050 is configured through relaying of the relay terminal 1030, the IP layer 1011-1 of the remote terminal 1010 in the third exemplary embodiment of the user plane protocol structure for supporting the relay function may be connected to the IP layer 1071-1 of the core network 1070.

Meanwhile, in the SDAP layer, the PDCP layer, the RLC layer, the MAC layer and the PHY layer, the remote terminal 1010 may be connected to the relay terminal 1030 through the PC5 interface for sidelink, and the relay terminal 1030 may be connected to the base station 1050 through the Uu interface. In other words, the SDAP layer, the PDCP layer, the RLC layer, the MAC layer and the PHY layer may be terminated at the link between the remote terminal 1010 and the relay terminal 1030, and at the link between the relay terminal 1030 and the base station 1050. The PC5-SDAP layer 1012-2 of the remote terminal 1010 may be connected to the PC5-SDAP layer 1032-1 of the relay terminal 1030. The Uu-SDAP layer 1032-2 of the relay terminal 1030 may be connected to the Uu-SDAP layer 1053-2 of the base station 1050. The PC5-PDCP layer 1013-2 of the remote terminal 1010 may be connected to the PC5-PDCP layer 1033-1 of the relay terminal 1030. The Uu-PDCP layer 1033-2 of the relay terminal 1030 may be connected to the Uu-PDCP layer 1053-1 of the base station 1050.

An adaptation layer may be further defined in the user plane protocol structure of the communication system 1000. In an exemplary embodiment, the adaptation layer may be an upper layer of the SDAP layer. The adaptation layer may be used to effectively configure connections or routing for multiplexing between the base station 1050 and one or more remote terminals 1010. The adaptation layer may perform QoS flow mapping or QoS flow routing between the base station 1050 and the relay terminal 1030.

FIG. 10E shows an exemplary embodiment in which the adaptation layer is supported in the Uu interface between the base station 1050 and the relay terminal 1030 and the PC5 interface between the remote terminal 1010 and the relay terminal 1030. However, this is only an example for convenience of description, and exemplary embodiments of the present disclosure are not limited thereto. For example, in another exemplary embodiment of the communication system 1000, the adaptation layer above the SDAP layer may be supported in the Uu interface between the base station 1050 and the relay terminal 1030, and may not be supported in the PC5 interface between the remote terminal 1010 and the relay terminal 1030. The adaptation layer may be configured above the SDAP layer (i.e., Uu-SDAP layers 1032-2 and 1052-1) of the Uu interface in the relay terminal 1030 and the base station 1050, and may be configured above the SDAP layer (i.e., PC5-SDAP layers 1012-1 and 1032-1) of the PC5 interface in the remote terminal 1010 and the relay terminal 1030.

Based on the third exemplary embodiment of the user plane protocol structure shown in FIG. 10E, the relay terminal 1010 may perform a relay role based on the QoS flow routing scheme. In the QoS flow routing scheme, mapping between QoS flows in the Uu interface and QoS flows in the PC5 interface may be performed or provided.

Figure 10F:
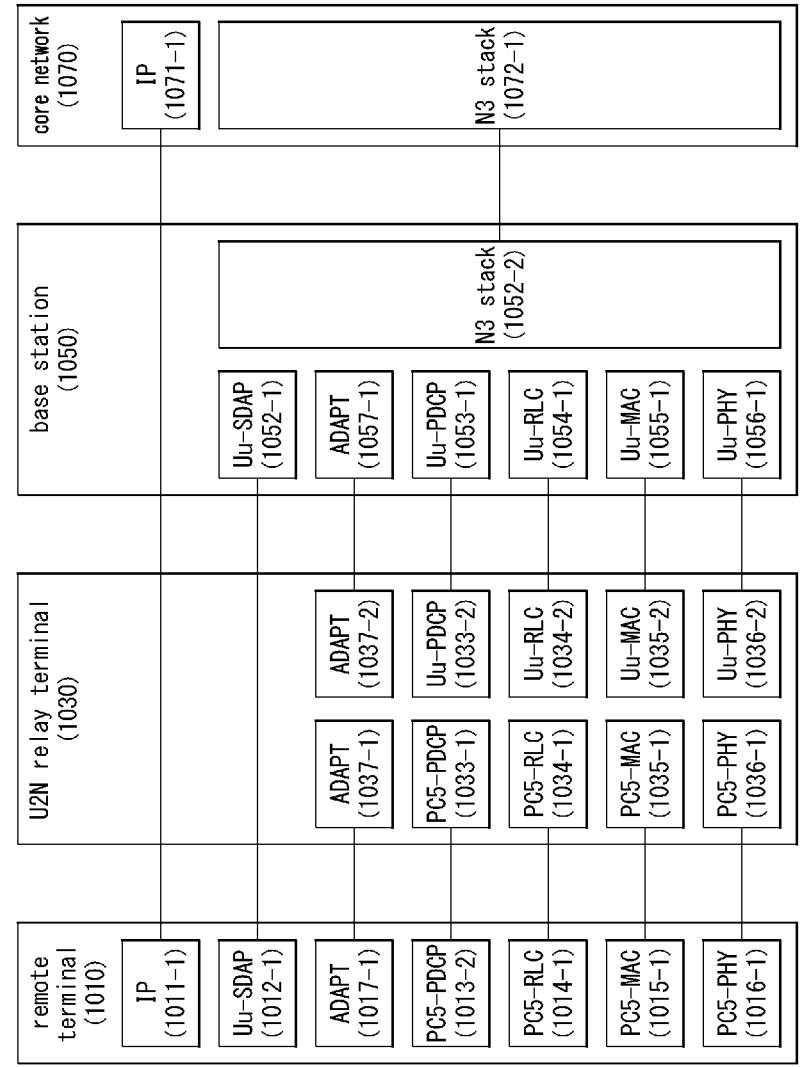

Referring to FIG. 10F, the fourth exemplary embodiment of the user plane protocol structure for supporting the relay function may support the relay function according to the RB routing scheme. In the fourth exemplary embodiment of the user plane protocol structure for supporting the relay function in the communication system 1000, when the connection between the remote terminal 1010 and the base station 1050 is configured through relaying of the relay terminal 1030, the IP layer 1011-1 of the remote terminal 1010 may be connected to the IP layer 1071-1 of the core network 1070. Meanwhile, in the SDAP layer, the remote terminal 1010 may be connected to the base station 1050 through the Uu interface. In other words, the SDAP layer may be terminated at the link between the remote terminal 1010 and the base station 1050. The Uu-SDAP layer 1012-1 of the remote terminal 1010 may be connected to the Uu-SDAP layer 1052-1 of the base station. The SDAP layers may be located in the remote terminal 1010 and the base station 1050, and may operate as peer-to-peer protocols between them.

Meanwhile, in the PDCP layer, RLC layer, MAC layer, and PHY layer, the remote terminal 1010 may be connected to the relay terminal 1030 through the PC5 interface for sidelink, and the relay terminal 1030 may be connected to the base station 1050 through the Uu interface. In other words, the PDCP layer, RLC layer, MAC layer, and PHY layer may be terminated at the link between the remote terminal 1010 and the relay terminal 1030, and at the link between the relay terminal 1030 and the base station 1050. The PC5-PDCP layer 1013-2 of the remote terminal 1010 may be connected to the PC5-PDCP layer 1033-1 of the relay terminal 1030. The Uu-PDCP layer 1033-2 of the relay terminal 1030 may be connected to the Uu-PDCP layer 1053-1 of the base station 1050.

An adaptation layer may be further defined in the user plane protocol structure of the communication system 1000. In an exemplary embodiment, the adaptation layer may be an upper layer of the PDCP layer. The adaptation layer may be used to effectively configure connections or routing for multiplexing between the base station 1050 and one or more remote terminals 1010. The adaptation layer may perform RB mapping or RB routing between the base station 1050 and the relay terminal 1030.

FIG. 10F shows an exemplary embodiment in which the adaptation layer is supported in the Uu interface between the base station 1050 and the relay terminal 1030 and the PC5 interface between the remote terminal 1010 and the relay terminal 1030. However, this is only an example for convenience of description, and exemplary embodiments of the present disclosure are not limited thereto. For example, in another exemplary embodiment of the communication system 1000, the adaptation layer above the PDCP layer may be supported in the Uu interface between the base station 1050 and the relay terminal 1030, and may not be supported in the PC5 interface between the remote terminal 1010 and the relay terminal 1030. The adaptation layer may be configured above the PDCP layer of the Uu interface (i.e., Uu-PDCP layers 1033-2 and 1053-1) in the relay terminal 1030 and the base station 1050, and may be configured above the PDCP layer (i.e., PC5-PDCP layers 1013-1 and 1033-1) of the PC5 interface in the remote terminal 1010 and the relay terminal 1030.

Based on the user plane protocol structure shown in FIG. 10F, the relay terminal 1010 may perform a relay role based on the RB routing scheme. In the RB routing scheme, mapping between RBs in the Uu interface and RBs in the PC5 interface may be performed or provided.

Figure 10G:
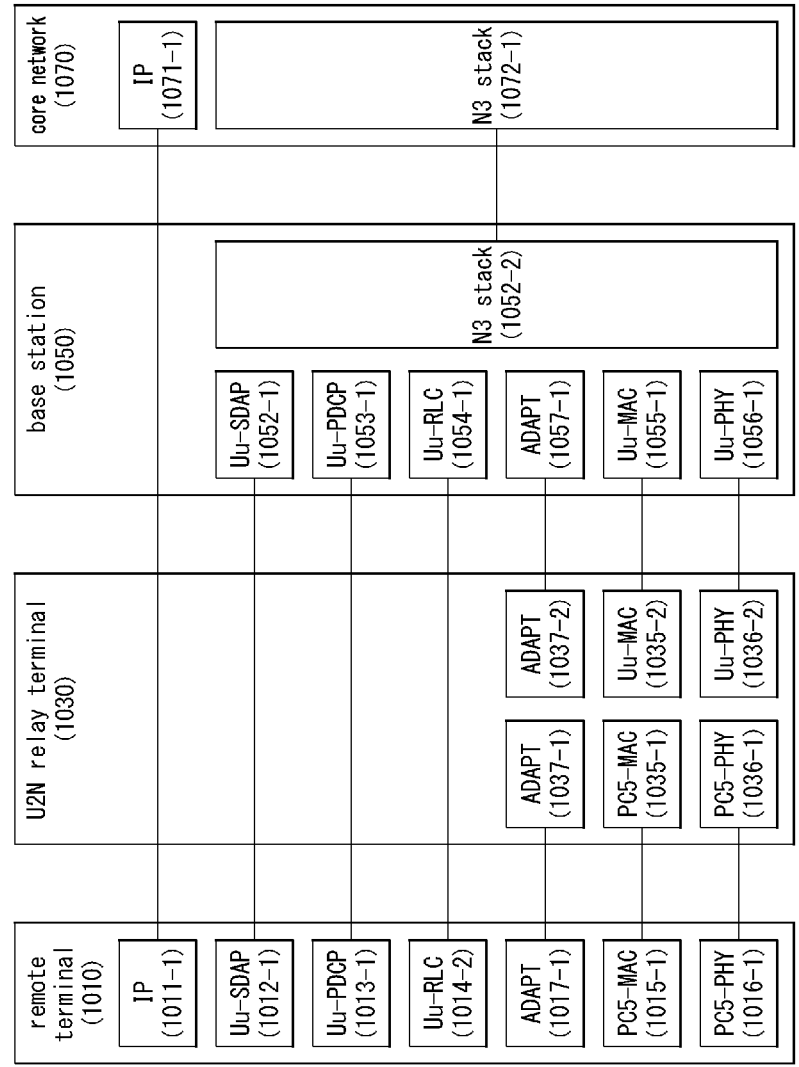

Referring to FIG. 10G, the fifth exemplary embodiment of the user plane protocol structure for supporting the relay function may support the relay function according to the logical channel routing scheme. In the fifth exemplary embodiment of the user plane protocol structure for supporting the relay function in the communication system 1000, when the connection between the remote terminal 1010 and the base station 1050 is configured through relaying of the relay terminal 1030, the IP layer 1011-1 of the remote terminal 1010 may be connected to the IP layer 1071-1 of the core network 1070. Meanwhile, in the SDAP layer, the PDCP layer, and the RLC layer, the remote terminal 1010 may be connected to the base station 1050 through the Uu interface. In other words, the SDAP layer, the PDCP layer, and the RLC layer may be terminated at the link between the remote terminal 1010 and the base station 1050. The Uu-SDAP layer 1012-1 of the remote terminal 1010 may be connected to the Uu-SDAP layer 1052-1 of the base station. The Uu-PDCP layer 1013-1 of the remote terminal 1010 may be connected to the Uu-PDCP layer 1053-1 of the base station. The Uu-RLC layer 1014-2 of the remote terminal 1010 may be connected to the Uu-RLC layer 1054-1 of the base station. The SDAP layer, the PDCP layer, and the RLC layer may be located in the remote terminal 1010 and the base station 1050 and may operate as peer-to-peer protocols between them. A transmission function including a HARQ function may be performed for each interface, and data order assurance and security functions may be performed between ends of the remote terminal 1010 and the base station 1050. In particular, since the RLC layer is located between the ends of the remote terminal 1010 and the base station 1050, retransmission of data transmitted in the Uu interface and the sidelink interface may be performed between the ends.

Meanwhile, in the MAC layer and the PHY layer, the remote terminal 1010 may be connected to the relay terminal 1030 through the PC5 interface for sidelink, and the relay terminal 1030 may be connected to the base station 1050 through the Uu interface. In other words, the MAC layer and the PHY layer may be terminated at the link between the remote terminal 1010 and the relay terminal 1030, and at the link between the relay terminal 1030 and the base station 1050.

An adaptation layer may be further defined in the user plane protocol structure of the communication system 1000. In an exemplary embodiment, the adaptation layer may be an upper layer of the MAC layer. The adaptation layer may be used to effectively configure connections or routing for multiplexing between the base station 1050 and one or more remote terminals 1010. The adaptation layer may perform logical channel mapping or logical channel routing functions between the base station 1050 and the relay terminal 1030.

FIG. 10G shows an exemplary embodiment in which the adaptation layer is supported in the Uu interface between the base station 1050 and the relay terminal 1030 and the PC5 interface between the remote terminal 1010 and the relay terminal 1030. However, this is only an example for convenience of description, and exemplary embodiments of the present disclosure are not limited thereto. For example, in another exemplary embodiment of the communication system 1000, the adaptation layer above the MAC layer may be supported in the Uu interface between the base station 1050 and the relay terminal 1030, and may not be supported in the PC5 interface between the remote terminal 1010 and the relay terminal 1030. The adaptation layer may be configured above the MAC layer (i.e., Uu-MAC layers 1035-2 and 1055-1) of the Uu interface in the relay terminal 1030 and the base station 1050, and may be configured above the MAC layer (i.e., PC5-PDCP layers 1015-1 and 1035-1) of the PC5 interface in the remote terminal 1010 and the relay terminal 1030.

Based on the user plane protocol structure shown in FIG. 10G, the relay terminal 1010 may perform a relay role based on the logical channel routing scheme. In the logical channel routing scheme, mapping between logical channels in the Uu interface and logical channels in the PC5 interface may be performed or provided.

Referring to FIG. 10H, the sixth exemplary embodiment of the user plane protocol structure for supporting the relay function may support the relay function according to the transport channel routing scheme. In the sixth exemplary embodiment of the user plane protocol structure for supporting the relay function in the communication system 1000, when the connection between the remote terminal 1010 and the base station 1050 is configured through relaying of the relay terminal 1030, the IP layer 1011-1 of the remote terminal 1010 may be connected to the IP layer 1071-1 of the core network 1070. Meanwhile, in the SDAP layer, the PDCP layer, the RLC layer, and the MAC layer, the remote terminal 1010 may be connected to the base station 1050 through the Uu interface. In other words, the SDAP layer, the PDCP layer, the RLC layer and the MAC layer may be terminated at the link between the remote terminal 1010 and the base station 1050. The Uu-SDAP layer 1012-1 of the remote terminal 1010 may be connected to the Uu-SDAP layer 1052-1 of the base station. The Uu-PDCP layer 1013-1 of the remote terminal 1010 may be connected to the Uu-PDCP layer 1053-1 of the base station. The Uu-RLC layer 1014-2 of the remote terminal 1010 may be connected to the Uu-RLC layer 1054-1 of the base station. The Uu-MAC layer 1015-2 of the remote terminal 1010 may be connected to the Uu-MAC layer 1055-1 of the base station. The SDAP layer, the PDCP layer, the RLC layer and the MAC layer may be located in the remote terminal 1010 and the base station 1050 and may operate as peer-to-peer protocols between them.

Meanwhile, in the PHY layer, the remote terminal 1010 may be connected to the relay terminal 1030 through the PC5 interface for sidelink, and the relay terminal 1030 may be connected to the base station 1050 through the Uu interface. In other words, the PHY layer may be terminated at the link between the remote terminal 1010 and the relay terminal 1030, and at the link between the relay terminal 1030 and the base station 1050.

An adaptation layer may be further defined in the user plane protocol structure of the communication system 1000. In an exemplary embodiment, the adaptation layer may be an upper layer of the PHY layer. The adaptation layer may be used to effectively configure connections or routing for multiplexing between the base station 1050 and one or more remote terminals 1010. The adaptation layer may perform transport channel mapping or transport channel routing functions between the base station 1050 and the relay terminal 1030.

FIG. 10H shows an exemplary embodiment in which the adaptation layer is supported in the Uu interface between the base station 1050 and the relay terminal 1030 and the PC5 interface between the remote terminal 1010 and the relay terminal 1030. However, this is only an example for convenience of description, and exemplary embodiments of the present disclosure are not limited thereto. For example, in another exemplary embodiment of the communication system 1000, the adaptation layer above the PHY layer may be supported in the Uu interface between the base station 1050 and the relay terminal 1030, and may not be supported in the PC5 interface between the remote terminal 1010 and the relay terminal 1030. The adaptation layer may be configured above the PHY layer (i.e., Uu-PHY layers 1036-2 and 1056-1) of the Uu interface in the relay terminal 1030 and the base station 1050, and may be configured above the PHY layer (i.e., PC5-PHY layers 1016-1 and 1036-1) of the PC5 interface in the remote terminal 1010 and the relay terminal 1030.

Based on the user plane protocol structure shown in FIG. 10H, the relay terminal 1010 may perform a relay role based on the transport channel routing scheme. In the transport channel routing scheme, mapping between transport channels in the Uu interface and transport channels in the PC5 interface may be performed or provided.

FIGS. 11A and 11B are exemplary diagrams for describing exemplary embodiments of a one-to-one mapping or one-to-many mapping method by a relay terminal in a wireless communication system.

Referring to FIGS. 11A and 11B, the relay terminal may configure sidelink(s) with one or more remote terminals. In the sidelink, one or more connections may be configured for each remote terminal according to the type of traffic. One connection or a plurality of connections may be configured between one relay terminal and one remote terminal. FIG. 11A shows a connection relationship between a plurality of remote terminals 1130, 1131, and 1132, one relay terminal 1120, and one base station 1110. FIG. 11B shows a connection relationship between a plurality of remote terminals 1135, 1136, and 1037, one relay terminal 1121, and one base station 1111. However, this is only an example for convenience of description, and exemplary embodiments of the present disclosure are not limited thereto.

In an exemplary embodiment of the one-to-one mapping method by the relay terminal in the communication system 1100 shown in FIG. 11A, a plurality of connections 1170, 1171, and 1172 for transmission of data units 1150, 1151, and 1152 or control signals may be configured between the relay terminal 1120 and the base station 1110. The connections 1170, 1171, and 1172 between the relay terminal 1120 and the base station 1110 may be configured based on a Uu protocol 1191. A plurality of connections 1180, 1181, and 1182 for transmission of data units 1160, 1161, and 1162 or control signals may be configured between the relay terminal 1120 and the plurality of remote terminals 1130, 1131, and 1132. The connections 1180, 1181, and 1182 between the relay terminal 1120 and the base station 1110 may be configured based on an SL protocol 1190.

The relay terminal 1120 may relay the connections between the base station 1110 and the plurality of remote terminals 1130, 1131, and 1132 in the one-to-one mapping manner. For example, the first SL connection 1180 for transmission of the first SL data unit 1160 between the relay terminal 1120 and the first remote terminal 1130 may be mapped to the first Uu connection 1170 for transmission of the first Uu data unit 1150 between the base station 1110 and the relay terminal 1120. The second SL connection 1181 for transmission of the second SL data unit 1161 between the relay terminal 1120 and the second remote terminal 1131 may be mapped to the second Uu connection 1171 for transmission of the second Uu data unit 1151 between the base station 1110 and the relay terminal 1120. The third SL connection 1182 for transmission of the third SL data unit 1162 between the relay terminal 1120 and the third remote terminal 1133 may be mapped to the third Uu connection 1172 for transmission of the third Uu data unit 1152 between the base station 1110 and the relay terminal 1120.

In an exemplary embodiment of the one-to-many mapping method by the relay terminal in the communication system 1100 shown in FIG. 11B, the connection 1175 for transmission of the data unit 1155 or control signals may be configured between the relay terminal 1121 and the base station 1111. The connection 1175 between the relay terminal 1121 and the base station 1111 may be configured based on a Uu protocol 1195. A plurality of connections 1185, 1186, and 1187 for transmission of data units 1165, 1166, and 1167 or control signals may be configured between the relay terminal 1121 and the plurality of remote terminals 1135, 1136, and 1137. The connections 1185, 1186, and 1187 between the relay terminal 1121 and the plurality of remote terminals 1135, 1136, and 1137 may be configured based on an SL protocol 1196.

The relay terminal 1121 may relay the connections between the base station 1111 and the plurality of remote terminals 1135, 1136, and 1137 in the one-to-many mapping manner. For example, the first to third SL connections 1185, 1186, and 1187 between the relay terminal 1121 and the remote terminals 1135, 1136, and 1137 and the Uu connection 1175 between the base station 1111 and the relay terminal 1121 may be mapped in the one-to-many manner. The first to third data units 1165, 1166, and 1167 transmitted from the first to third remote terminals 1135, 1136, and 1137 to the relay terminal 1121 may be multiplexed in the connection 1175 between the relay terminal 1121 and the base station 1111, and transmitted to the base station 1111. On the other hand, the first to third data units to be transmitted from the base station 1111 to the first to third remote terminals 1135, 1136, and 1137 may be multiplexed in the Uu connection 1175 between the relay terminal 1121 and the base station 1111, and transmitted to the relay terminal 1121. The relay terminal 1121 may transmit the multiplexed first to third data units to the first to third remote terminals 1135, 1136, and 1137 respectively corresponding thereto.

For multiplexing and/or routing in the Uu connection 1175 between the relay terminal 1121 and the base station 1111, a structure 1197 for multiplexing and/or routing may be additionally configured in the protocol structure constituting the Uu connection 1175. Here, the structure 1197 for multiplexing and/or routing may refer to the adaptation layer described with reference to FIGS. 10A to 10D. In the adaptation layer 1197, predetermined multiplexing identification information may be added to a header of each data unit or control signal delivered from the RLC layer. Here, the multiplexing identification information may include a terminal identifier of the remote terminal or a bearer identifier of a radio bearer (RB) of the remote terminal. The multiplexing identification information may be used to deliver data units and control signals, which are transmitted as being multiplexed, to the corresponding remote terminals or radio bearers, respectively. For example, the multiplexing identification information may be used to identify a plurality of remote terminals connected through one or more relay terminals. Alternatively, the multiplexing identification information may be used to identify each of one or a plurality of radio bearers included in each of a plurality of remote terminals connected through one or more relay terminals. The multiplexing identification information may indicate whether a corresponding data unit (i.e., data unit including the multiplexing identification information) is a data unit including multiplexed data units.

For example, the multiplexing identification information may include a predetermined terminal identifier corresponding to each remote terminal. The multiplexing identification information may include a first terminal identifier corresponding to the first remote terminal 1135, a second terminal identifier corresponding to the second remote terminal 1136, and a third terminal identifier corresponding to the third remote terminal 1137. The multiplexing identification information may be locally and temporarily defined and assigned for use in the routing function in the Uu connection 1175 or the adaptation layer 1197 between the relay terminal 1121 and the base station 1111. In other words, the multiplexing identification information may be defined by the RRC layer configuring the Uu connection 1175 between the relay terminal 1121 and the base station 1111. The multiplexing identification information may be limitedly used in the multiplexing function or routing function in the adaptation layer 1197. For example, the first to third terminal identifiers may refer to identifiers defined for the routing function in the adaptation layer 1197 corresponding to the Uu connection 1175 separately from identifiers such as cell radio network temporary identity (C-RNTI) previously given to the first to third remote terminals 1135, 1136, and 1137 from the base station 1111.

In uplink communication, when the first to third data units 1165, 1166, and 1167 are transmitted from the first to third remote terminals 1135, 1136, and 1137 to the relay terminal 1121, the adaptation layer of the relay terminal 1121 may perform the multiplexing operation on the first to third data units 1165, 1166, and 1167. For example, in the adaptation layer of the relay terminal 1121, a UL data unit 1155 in which the first to third data units 1165, 1166, and 1167 are multiplexed may be generated. A header 1156 included in the generated multiplexed UL data unit 1155 may include multiplexing identification information corresponding to each of the first to third remote terminals 1135, 1136, and 1137. Specifically, the header 1156 of the multiplexed UL data unit 1155 may include multiplexing identification information for identifying the data unit of the first remote terminal 1135, the data unit of the second remote terminal 1136, and the data unit of the third remote terminal 1137 in a payload of the multiplexed UL data unit 1155. The header 1156 of the multiplexed UL data unit 1155 may include information of the first to third terminal identifiers corresponding to the first to third remote terminals 1135, 1136, and 1137 and mapping information between the respective data units of the remote terminals and the first to third terminal identifiers. The generated multiplexed UL data unit 1155 may be transmitted to the base station 1111 through the Uu link 1175. The base station 1111 may receive the multiplexed UL data unit 1155 from the relay terminal 1121. Based on the multiplexing identification information included in the header 1156 of the multiplexed UL data unit 1155, the adaptation layer 1197 of the base station 1111 may identify or obtain the first to third data units 1165, 1166, and 1167 transmitted from the first to third remote terminals 1135, 1136, and 1137. The base station 1111 may transmit the identified or obtained first to third data units 1165, 1166, and 1167 to a core network (not shown).

On the other hand, in downlink communication, in order to transmit first to third data units to the first to third remote terminals 1135, 1136, and 1137, the base station 1111 may multiplex the first to third data units, and transmit a multiplexed data unit to the relay terminal 1121. In the adaptation layer of the base station 1111, a multiplexing operation may be performed on the first to third data units. For example, in the adaptation layer of the base station 1111, a DL data unit 1155 in which the first to third data units are multiplexed may be generated. A header 1156 included in the generated multiplexed DL data unit 1155 may include multiplexing identification information corresponding to each of the first to third remote terminals 1135, 1136, and 1137. Specifically, the header 1156 of the multiplexed DL data unit 1155 may include multiplexing identification information for identifying the data unit to be transmitted to the first remote terminal 1135, the data unit to be transmitted to the second remote terminal 1136, and the data unit to be transmitted to the third remote terminal 1137 in a payload of the multiplexed DL data unit 1155. The header 1156 of the multiplexed DL data unit 1155 may include information of the first to third terminal identifiers corresponding to the first to third remote terminals 1135, 1136, and 1137 and mapping information between the respective data units to be transmitted to the remote terminals, which are included in the payload, and the first to third terminal identifiers. The generated multiplexed DL data unit 1155 may be transmitted to the relay terminal 1121 through the Uu link 1175. The relay terminal 1121 may receive the multiplexed DL data unit 1155 from the base station 1111. Based on the multiplexing identification information included in the header 1156 of the multiplexed DL data unit 1155, the adaptation layer 1197 of the base station 1121 may identify or obtain the first to third data units 1165, 1166, and 1167 to be transmitted to the first to third remote terminals 1135, 1136, and 1137. The relay terminal 1121 may transmit the identified or obtained first to third data units 1165, 1166, and 1167 to the first to third remote terminals 1135, 1136, and 1137.

On the other hand, when a plurality of radio bearers (e.g., DRB(s), SRB(s), etc.) for communication with the base station 1111 are configured in one remote terminal, in the adaptation layers 1197 of the base station 1111 and the relay terminal 1121, one-to-many mapping for mapping of traffic to the radio bearers may be performed.

For example, uplink bearer mapping between each sidelink RLC channel corresponding to each radio bearer of the remote terminal, which corresponds to an ingress of a relaying path for uplink communication, and a Uu RLC channel corresponding to an egress of the relaying path for uplink communication may be performed. Different end-to-end radio bearers of the same or different remote terminals may be subjected to one-to-many (or N:1) mapping and multiplexing in one Uu RLC channel. Here, multiplexing identification information for identifying uplink traffic corresponding to the plurality of radio bearers may be provided to the adaptation layers 1197 of the relay terminal 1121 and the base station 1111. The multiplexing identification information may include an identifier for each remote terminal and an identifier for each radio bearer of each remote terminal. For example, in the adaptation layer 1197 of the relay terminal 1121, with respect to each uplink traffic, an identifier of a remote terminal from which each uplink traffic is transmitted and an identifier of a corresponding radio bearer may be assigned. On the other hand, based on the multiplexing identification information assigned by the relay terminal 1121, the adaptation layer 1197 of the base station 1111 may identify or distinguish a remote terminal from which each uplink traffic is transmitted and a radio bearer corresponding thereto.

On the other hand, downlink bearer mapping between a Uu RLC channel corresponding to an ingress of a relaying path for downlink communication, and each sidelink RLC channel corresponding to each radio bearer of the remoted terminal, which corresponds to an egress of the relaying path for downlink communication, may be performed. Different end-to-end radio bearers of the same or different remote terminals may be subjected to one-to-many (or N:1) mapping and multiplexing in one Uu RLC channel. Here, multiplexing identification information for identifying downlink traffic corresponding to the plurality of radio bearers may be provided to the adaptation layers 1197 of the relay terminal 1121 and the base station 1111. The multiplexing identification information may include an identifier for each remote terminal and an identifier for each radio bearer of each remote terminal. For example, in the adaptation layer 1197 of the base station 1111, with respect to each down traffic, an identifier of a remote terminal to which each downlink traffic is transmitted and an identifier of a corresponding radio bearer may be assigned. On the other hand, based on the multiplexing identification information assigned by the base station 1111, the adaptation layer 1197 of the relay terminal 1121 may identify or distinguish a remote terminal to which each downlink traffic is transmitted and a radio bearer corresponding thereto.

The multiplexing identification information assigned to data or traffic by the adaptation layer may include an identifier for each remote terminal and/or an identifier for each radio bearer of each remote terminal. Here, the identifier for each radio bearer of each remote terminal may correspond to a Uu radio bearer ID of each remote terminal. The multiplexing identification information may be defined and assigned locally and temporarily for use in the corresponding relay terminal or the corresponding adaptation layer. The mapping in the relay terminal may be performed between PC5 RLC channel identifiers, terminal identifiers of the remote terminals, identification information of the Uu radio bearers, and Uu RLC channel identifiers.

According to the exemplary embodiments of the present disclosure, through a relaying method and a relaying apparatus using sidelink communication between terminals in the wireless communication system, services of a base station or a communication network may be reliably provided even to a terminal that does not smoothly perform direct communication with the base station.

According to the exemplary embodiments of the present disclosure, protocol stacks capable of improving a relaying performance of a relay terminal performing a relay role between a base station and one or more remote terminals by using sidelink communication in the wireless communication system, and a relaying method and a relaying apparatus according thereto may be provided.

However, the effects that can be achieved by the relaying method and apparatus using sidelink communication in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A relaying method performed by a relay terminal using sidelink (SL) in a communication system, the relaying method comprising:
receiving a plurality of first data units from a plurality of remote terminals;
generating a multiplexed data unit including identification information of the plurality of remote terminals and the plurality of first data units; and
transmitting the multiplexed data unit to a base station,
wherein the identification information includes a plurality of terminal identifiers used to identify the plurality of remote terminals and a plurality of bearer identifiers used to identify one or more radio bearers corresponding to each of a plurality of Uu links between the plurality of remote terminals and the base station, a protocol structure of the relay terminal includes a PC5-adaptation layer corresponding to a sidelink with each of the plurality of remote terminals and the Uu-adaptation layer corresponding to a Uu link with the base station, and the PC5-adaptation layer is configured for multiplexing a plurality of data units transmitted and received between the relay terminal and the plurality of remote terminals, and
wherein the generating of the multiplexed data unit comprises:
delivering, by a plurality of first entities supporting functions of a radio link control (RLC) layer included in the relay terminal, the plurality of first data units to a second entity performing functions of an adaptation layer included in the relay terminal; and
generating, by the second entity, the multiplexed data unit including the identification information of the plurality of remote terminals and the plurality of first data units.

2. The relaying method according to claim 1, wherein the identification information is delivered from the base station to the relay terminal whenever each of the plurality of remote terminals is connected to the relay terminal.

3. The relaying method according to claim 1, wherein each of the one or more radio bearers corresponding to the each of the plurality of Uu links between the plurality of remote terminals and the base station is independently configured, a first data unit of a first remote terminal among the plurality of remote terminals corresponds to a first radio bearer, and a second data unit of a second remote terminal among the plurality of remote terminals corresponds to a second radio bearer.

4. The relaying method according to claim 1, wherein the protocol structure of the relay terminal further includes a PC5 physical (PC5-PHY) layer, a PC5 media access control (PC5-MAC) layer, and a PC5-RLC layer corresponding to the sidelink with each of the plurality of remote terminals, and a Uu-PHY layer, a Uu-MAC layer, and a Uu-RLC layer corresponding to the Uu link with the base station.

5. A relay terminal performing relaying by using sidelink in a communication system, the relay terminal comprising:
a processor;
a memory electronically communicating with the processor; and
instructions stored in the memory,
wherein when executed by the processor, the instructions cause the relay terminal to:
receive a plurality of first data units from a plurality of remote terminals;
generate a multiplexed data unit including identification information of the plurality of remote terminals and the plurality of first data units; and
transmit the multiplexed data unit to a base station,
wherein the identification information includes a plurality of terminal identifiers used to identify the plurality of remote terminals and a plurality of bearer identifiers used to identify one or more radio bearers corresponding to each of a plurality of Uu links between the plurality of remote terminals and the base station, a protocol structure of the relay terminal includes a PC5-adaptation layer corresponding to a sidelink with each of the plurality of remote terminals and the Uu-adaptation layer corresponding to a Uu link with the base station, and the PC5-adaptation layer is configured for multiplexing a plurality of data units transmitted and received between the relay terminal and the plurality of remote terminals, and
wherein the instructions further cause the relay terminal to:
deliver, by a plurality of first entities supporting functions of a radio link control (RLC) layer included in the relay terminal, the plurality of first data units to a second entity performing functions of an adaptation layer included in the relay terminal; and
generate, by the second entity, the multiplexed data unit including the identification information of the plurality of remote terminals and the plurality of first data units.

6. The relay terminal according to claim 5, wherein a radio bearer for each of the plurality of remote terminals is independently configured, a first data unit of a first remote terminal among the plurality of remote terminals corresponds to a first radio bearer, and a second data unit of a second remote terminal among the plurality of remote terminals corresponds to a second radio bearer.

7. The relay terminal according to claim 5, wherein the protocol structure of the relay terminal further includes a PC5 physical (PC5-PHY) layer, a PC5 media access control (PC5-MAC) layer, and a PC5-RLC layer corresponding to the sidelink with each of the plurality of remote terminals, and a Uu-PHY layer, a Uu-MAC layer, and a Uu-RLC layer corresponding to the Uu link with the base station.

8. A transmitting method performed by a remote terminal using sidelink (SL) in a communication system, the transmitting method comprising:
generating a plurality of data units to transmit to a base station through a relay terminal;
generating a multiplexed data unit including identification information of the plurality of data units based on a PC5-adaptation layer included in the remote terminal; and
transmitting the multiplexed data unit to the relay terminal,
wherein the plurality of data units correspond to a plurality of radio bearers for communication with the base station, and the identification information includes a plurality of bearer identifiers used to identify the plurality of radio bearers, and a protocol structure of the remote terminal includes the PC5-adaptation layer, the PC5-adaptation layer corresponding to a sidelink with the relay terminal,
wherein the generating of the multiplexed data unit comprises:
delivering, by a plurality of first entities supporting functions of a radio link control (RLC) layer included in the remote terminal, the plurality of data units to a second entity performing functions of an adaptation layer included in the remote terminal; and generating, by the second entity, the multiplexed data unit including the identification information of the plurality of data units and the plurality of data units.

* * * * *